US007444864B2

(12) United States Patent
Yajima et al.

(10) Patent No.: US 7,444,864 B2

(45) Date of Patent: Nov. 4, 2008

(54) LIQUID DETECTING DEVICE, LIQUID CONTAINER AND METHOD OF MANUFACTURING LIQUID DETECTING DEVICE

(75) Inventors: Minoru Yajima, Nagano (JP); Akira Ichihashi, Nagano (JP); Junhua Zhang, Nagano (JP); Akihisa Wanibe, Nagano (JP)

(73) Assignee: Seiko Epson Corporation, Tokyo (JP)

(*) Notice: Subject to any disclaimer, the term of this patent is extended or adjusted under 35 U.S.C. 154(b) by 331 days.

(21) Appl. No.: 11/393,633

(22) Filed: Mar. 30, 2006

(65) Prior Publication Data

US 2006/0219726 A1 Oct. 5, 2006

(30) Foreign Application Priority Data

Mar. 31, 2005 (JP) ........................... P2005-103265
Apr. 15, 2005 (JP) ........................... P2005-118963
Apr. 27, 2005 (JP) ........................... P2005-130601

(51) Int. Cl.
*G01F 23/28* (2006.01)
*G01F 23/00* (2006.01)
*B41J 2/175* (2006.01)

(52) U.S. Cl. ......................... 73/290 V; 347/86; 347/85; 73/290 R

(58) Field of Classification Search ................... 347/19, 347/6, 7, 68, 84, 85, 86, 87; 73/290, 64.53, 73/54.28, 252, 290 R, 290 V; 29/25.35, 595; 101/480; 220/694; 310/338

See application file for complete search history.

(56) References Cited

U.S. PATENT DOCUMENTS 4,507,583 A 3/1985 Jensen et al.

(Continued)

FOREIGN PATENT DOCUMENTS

CN 1 421 319 A 6/2003

(Continued)

OTHER PUBLICATIONS

Combined Search and Examination Report for U.K. patent appln. No. GB0606406.7 (Jul. 10, 2006).

*Primary Examiner*—Stephen D. Meier
*Assistant Examiner*—Rene Garcia, Jr.
(74) *Attorney, Agent, or Firm*—Stroock & Stroock & Lavan LLP

(57) ABSTRACT

A liquid detecting device (1200) including: a unit base (1210), provided with a recessed portion (1211) on an upper face thereof and containing a first material; a sensor base (1220), accommodated in the recessed portion and containing a second material different from the first material; a sensor chip (1230), mounted on an upper face of the sensor base (1220) and having a sensor cavity (1232) for receiving a liquid as a detection target, in which a lower face of the sensor cavity (1232) is formed to be opened for allowing the liquid to flow therein and an upper face thereof is closed by a vibration plate (1233) and provided with a piezoelectric element (1234) mounted on an upper face of the vibration plate (1233); an adhesive layer (1242), formed on the upper face of the sensor base and fixing and sealing the sensor chip (1230) and the sensor base (1220) to each other; and an adhesive film (1240), which fixes and seals the sensor base (1220) and the unit base (1210) to each other and of which an inner peripheral portion is adhered to the upper face of the sensor base (1220) and an outer peripheral portion is adhered to the upper face of the unit base (1210).

29 Claims, 16 Drawing Sheets

U.S. PATENT DOCUMENTS

| | | | | | |
|---|---|---|---|---|---|
| 4,565,942 | A * | 1/1986 | Sakai et al. | 310/338 |
| 5,877,411 | A * | 3/1999 | Namerikawa et al. | 73/64.53 |
| 6,412,344 | B1 * | 7/2002 | Danicich et al. | 73/290 V |
| 6,470,744 | B1 * | 10/2002 | Usui et al. | 73/290 R |
| 6,675,646 | B2 * | 1/2004 | Nishihara | 73/290 V |
| 6,802,602 | B2 | 10/2004 | Sakai et al. | |
| 6,874,861 | B2 * | 4/2005 | Farr et al. | 347/19 |
| 6,921,160 | B2 * | 7/2005 | Tsukada | 347/86 |
| 7,175,244 | B2 * | 2/2007 | Usui et al. | 347/7 |
| 7,188,520 | B2 * | 3/2007 | Usui et al. | 73/290 V |
| 7,225,670 | B2 * | 6/2007 | Tsukada et al. | 73/290 R |
| 7,251,996 | B2 * | 8/2007 | Usui et al. | 73/290 R |
| 7,267,000 | B1 * | 9/2007 | Usui et al. | 73/290 V |
| 7,270,386 | B2 * | 9/2007 | Takahashi et al. | 347/7 |
| 7,281,776 | B2 * | 10/2007 | Usui et al. | 347/7 |
| 7,306,308 | B2 * | 12/2007 | Tsukada et al. | 347/7 |
| 7,360,417 | B2 * | 4/2008 | Dockendorff et al. | 73/290 R |
| 2004/0012310 | A1 | 1/2004 | Katakura et al. | |
| 2006/0268077 | A1 * | 11/2006 | Shinada et al. | 347/85 |

FOREIGN PATENT DOCUMENTS

| | | | | |
|---|---|---|---|---|
| EP | 0 660 092 | A1 | | 6/1995 |
| EP | 1 053 881 | A1 | | 11/2000 |
| EP | 1 245 393 | A1 | | 10/2002 |
| EP | 1 462 263 | A2 | | 9/2004 |
| GB | 2 413 385 | A | | 10/2005 |
| GB | 2421007 | A | * | 6/2006 |
| GB | 2424623 | A | * | 10/2006 |
| GB | 2424710 | A | * | 10/2006 |
| JP | 2001-146024 | A | | 5/2001 |
| JP | 2001-146030 | A | | 5/2001 |
| JP | 2002-071428 | A | | 3/2002 |

* cited by examiner

LIQUID DETECTING DEVICE, LIQUID CONTAINER AND METHOD OF MANUFACTURING LIQUID DETECTING DEVICE

BACKGROUND OF THE INVENTION

1. Technical Field of the Invention

The present invention particularly relates to a liquid detecting device which is suitable for detecting a residual amount of a liquid (ink) in a liquid ejecting apparatus such as a recording apparatus of an ink jet type, a liquid container including the same device, and a method of manufacturing the liquid detecting device.

2. Description of the Related Art

Typical examples of a conventional liquid ejecting apparatus include a recording apparatus of an ink jet type which comprises a recoding head of an ink jet type for recording an image. Examples of other liquid ejecting apparatuses include an apparatus comprising a coloring material ejecting head to be used for manufacturing a color filter of a liquid crystal display, an apparatus comprising an electrode material (conducting paste) ejecting head to be used for forming an electrode of an organic EL display or a surface emitting display (FED), an apparatus comprising a bioorganism ejecting head to be used for manufacturing a biochip, and an apparatus comprising a sample ejecting head to be a precision pipette.

The recording apparatus of the ink jet type according to the typical example of the liquid ejecting apparatus has such a structure that an ink jet recording head having pressure generating means for pressurizing a pressure generating chamber and a nozzle opening for ejecting a pressurized ink as an ink droplet is mounted on a carriage and the ink in an ink container is consecutively supplied to the recording head through a passage, and printing can be thus carried out continuously. The ink container is constituted as a detachable cartridge which can easily be exchanged by a user when the ink is consumed, for example.

Conventionally, a method of managing the consumption of the ink by the ink cartridge includes a method of integrating, in software, the number of ejections of the ink droplet by the recording head or an amount of the ink sucked for a maintenance to manage the consumption of the ink by a calculation and a method of attaching an electrode for detecting a liquid level to the ink cartridge, thereby managing a time that the ink is actually consumed in a predetermined amount.

However, the method of integrating, in software, the number of ejections of the ink droplet or the amount of the ink to manage the consumption of the ink by a calculation has the following drawback. Some heads have a variation in a weight of the ejected ink droplet. The variation in the weight of the ink droplet does not influence picture quality and the ink cartridge is filled with the ink in an amount having a margin in consideration of the case in which an error of the amount of the consumption of the ink which is made by the variation is accumulated. Accordingly, there is a problem in that the ink is left corresponding to a margin depending on an individual.

On the other hand, the method of managing the time that the ink is consumed by the electrode can detect the actual amount of the ink. Therefore, the residual amount of the ink can be managed with a high reliability. However, the detection of the liquid level of the ink depends on a conductivity of the ink. For this reason, there is a drawback that the type of the ink which can be detected is restricted and a seal structure of the electrode is complicated. Moreover, a noble metal having a high conductivity and a high corrosion resistance is usually used as a material of the electrode. Consequently, a cost for manufacturing the ink cartridge is increased. Furthermore, it is necessary to attach two electrodes. Therefore, a manufacturing process is increased. As a result, the manufacturing cost is increased.

Therefore, an apparatus developed to solve the problems has been disclosed as a piezoelectric device (referred to as a sensor unit or a liquid detecting device) in JP-A-2001-146024. The sensor unit serves to monitor the residual amount of the ink in the ink cartridge by utilizing the fact that a resonant frequency of a residual oscillation signal caused by a residual oscillation (free oscillation) of an vibration plate after a forced oscillation is varied in the case in which an ink is present or is not present in a cavity opposed to the vibration plate in which a piezoelectric element is laminated.

In the case in which the sensor unit described in JP-A-2001-146024 is used, it is necessary to cause the ink to freely enter the cavity opposed to the vibration plate. However, it is necessary to prevent the ink from entering a side on which a piezoelectric unit to be an electrical element is disposed. For this reason, different members should be sealed strictly.

As sealing structure for sealing the sensor unit and the container body, there is known a structure that the sensor unit is bonded directly to the circumferential edge of an opening of the container body or a structure that the sensor unit is bonded directly to the circumferential edge of an opening of a module and then the module is mounted on the container body with an 0 ring therebetween. However, since the sensor unit is bonded to the circumferential edge of the opening, deviation in size makes it difficult to secure the sealing ability. In addition, when the sensor unit is bonded directly to the circumferential edge of the opening of the container body or the circumferential edge of the opening of the module, it can be easily affected by a wave motion of the ink or bubbles in the ink, thereby causing erroneous detection.

Furthermore, seal means for sealing the different members in the sensor unit includes means for giving a breaking margin, thereby sealing a clearance by a surface pressure, for example, an O ring. In the seal means such as the O ring, a sealing performance depends on precision in the dimensions of a plurality of components. For this reason, there is a problem in that a mass production is hard to stabilize. Moreover, a component for breaking the O ring is required separately. Consequently, there is also a problem in that a size of a sensor unit (a liquid detecting device) is increased.

As another seal means, moreover, it can be proposed to seal a clearance between components with an adhesive. In the case in which the adhesive is used, there is a problem in that handling is troublesome and a stabilization of a process in the mass production is hard to implement. In the case in which a plurality of components formed of different materials (for example, ceramics, metals or resins) is combined to fabricate the sensor unit (the liquid detecting device) in order to enhance oscillating characteristics, particularly, it is hard to select the adhesive and it is also demanded that a place for using the adhesive should be limited as greatly as possible.

SUMMARY OF THE INVENTION

The present invention has been contrived in consideration of the above-mentioned circumstances. A first object of the invention is to provide a container having a liquid detecting function in which a sealing work at the time of mounting a sensor unit on a container body can be simply and reliably carried out without being affected by accuracy in sizes of components and which has a structure that is little affected by a wave motion of ink or bubbles in the ink.

A second object of the invention is to provide a liquid detecting device which can reliably seal components formed by different materials without a great influence of precision in the dimensions of the components, and can have a high assembling workability and can stabilize a process in a mass production, and furthermore, can have a high space efficiency and can reduce a size, a liquid container including the liquid detecting device, and a method of manufacturing the liquid detecting device. To accomplish at least one of the objects, an embodiment of the invention has the following configuration:

(1). A liquid detecting device comprising: a unit base having a recessed portion on an upper face and formed of a resin, a sensor base accommodated in the recessed portion on the upper face of the unit base and formed of a metal, and a sensor chip mounted on an upper face of the sensor base, wherein the sensor chip has a sensor cavity for receiving a liquid to be a detection target and has such a structure that a lower face of the sensor cavity is opened to freely receive the liquid and an upper face is closed with an vibration plate, and a piezoelectric unit is disposed on an upper face of the vibration plate, the sensor base and the unit base have liquid reserving spaces to communicate with the sensor cavity, the sensor chip and the sensor base are fixed and sealed with each other through an adhesive layer provided on the upper face of the sensor base, and the sensor base and the unit base are fixed and sealed with each other through an adhesive film having an inner peripheral portion bonded to the upper face of the sensor base through the adhesive layer and an outer peripheral portion bonded to an upper face wall provided around the recessed portion of the unit base.

According to the embodiment, by simply incorporating the sensor base mounting the sensor chip into the unit base from above and sticking the adhesive film across upper faces of two components which are arranged, that is, both of the upper faces of the sensor base and the unit base in that state, it is possible to fix and seal the two components formed by different materials (the sensor base formed of a metal and the unit base formed of a resin) at the same time. Accordingly, an assembling workability is very excellent. Moreover, the adhesive film is simply stuck across the two components. Therefore, it is possible to seal the components without a great influence of precision in the dimension of each of the components. In the case in which the adhesive film is to be welded by heating and pressurizing the adhesive film through a mass-produced machine, for example, it is possible to enhance a sealing performance and to carry out a stabilization in the mass production by simply managing a temperature, a pressure and a pressure welding time through the mass-produced machine. Furthermore, the adhesive film to influence the sealing property can easily be attached, and furthermore, a space efficiency is high. Therefore, it is possible to reduce the size of the sensor unit.

(2). The liquid detecting device according to (1), wherein the sensor base and the unit base have, as the liquid reserving spaces, an entrance-side flow passage and an exit-side flow passage for the sensor cavity respectively, and have such a structure that the liquid is supplied to the sensor cavity through the entrance-side flow passage and is discharged from the sensor cavity through the exit-side flow passage.

According to the embodiment, moreover, there is employed a structure in which the entrance and exit-side flow passages for the sensor cavity are formed in the sensor base and the unit base respectively and the liquid flows into the sensor cavity through the entrance-side flow passage and is discharged through the exit-side flow passage. Therefore, the liquid persistently flows to the sensor cavity. Consequently, it is possible to prevent an erroneous detection from being caused by the stay of the liquid or air bubbles in the sensor cavity.

(3). The liquid detecting device according to (1) or (2), wherein the upper face of the sensor base is protruded upward from the recessed portion of the unit base, and the adhesive film is bonded to the upper face of the sensor base in a higher position than a bonding position to the upper face wall provided around the recessed portion of the unit base.

According to the embodiment, furthermore, the height of the film bonding face to the unit base is set to be smaller than that of the film bonding face to the sensor base. Therefore, it is possible to press the sensor base with a step by means of the adhesive film and to increase a fixing force of the sensor base to the unit base. Moreover, it is possible to carry out an attachment having no looseness.

(4). A liquid container comprising: a container body having a delivery passage for feeding a liquid stored in an inner part to an outside; and the liquid detecting device positioned in the vicinity of a terminal of the delivery passage and attached to the container body, wherein the liquid detecting device described above is provided as the liquid detecting device, and the entrance-side flow passage, the sensor cavity and the exit-side flow passage in the liquid detecting device are provided in series in the delivery passage so as to be arranged from an upstream side in this order.

According to the embodiment, moreover, the liquid detecting device is disposed in the vicinity of the terminal of the delivery passage of the container body, and the entrance-side flow passage, the sensor cavity and the exit-side flow passage in the liquid detecting device are provided in series in the delivery passage so as to be arranged from the upstream side in this order. Therefore, it is possible to accurately detect the residual amount of the liquid in the container body.

(5). A method of manufacturing a liquid detecting device comprising a unit base having a recessed portion on an upper face and formed of a resin, a sensor base accommodated in the recessed portion on the upper face of the unit base and formed of a metal, and a sensor chip mounted on an upper face of the sensor base, wherein the sensor chip has a sensor cavity for receiving a liquid to be a detection target and has such a structure that the sensor cavity has a lower face opened to freely receive the liquid and an upper face closed with an vibration plate, and a piezoelectric unit is disposed on an upper face of the vibration plate, the sensor chip and the sensor base are fixed and sealed with each other through an adhesive layer provided on the upper face of the sensor base, and the sensor base and the unit base are fixed and sealed with each other through an adhesive film having an inner peripheral portion bonded to the upper face of the sensor base through the adhesive layer and an outer peripheral portion bonded to an upper face wall provided around the recessed portion of the unit base, the method comprising the steps of forming the adhesive layer on the upper face of the sensor base and mounting the sensor chip on the adhesive layer, thereby fixing and sealing the sensor chip and the sensor base integrally through the adhesive layer, and accommodating the sensor base provided integrally with the sensor chip in the recessed portion on the upper face of the unit base and putting the adhesive film from above in that state to bond the inner peripheral portion of the adhesive film to the upper face of the sensor base through the adhesive layer and to bond the outer peripheral portion to the upper face wall provided around the recessed portion of the unit base, thereby fixing and sealing the sensor base and the unit base integrally through the adhesive film.

According to the embodiment, furthermore, by simply incorporating the sensor base mounting the sensor chip into the unit base from above and sticking the adhesive film across upper faces of the two components which are arranged, that is, both of the upper faces of the sensor base and the unit base in that state, it is possible to fix and seal the two components formed by different materials (the sensor base formed of a metal and the unit base formed of a resin) at the same time. Accordingly, an assembling workability is very excellent.

(6). A liquid container comprising: a container body having a liquid reservoir therein, a delivery passage for sending out liquid from the reservoir, and a sensor accommodating portion; a sensor unit which is mounted on the sensor accommodating portion and which detects the liquid; buffer chambers which are disposed in the container body, are adjacent to the sensor accommodating portion through a sensor receiving wall, and are disposed in the delivery passage so as to communicate with the upstream side and the downstream side of the delivery passage; a ring-shaped seal member having elasticity and sealing a space between the sensor unit and the sensor receiving wall; and a pressurizing spring for pressurizing the sensor unit against the sensor receiving wall to press the seal member and to give a surface pressure necessary for the sealing to the seal member, the sensor unit, and the sensor receiving wall.

According to the embodiment, the ring-shaped seal member having elasticity is disposed between the sensor unit and the sensor receiving wall and the space between the sensor unit and the sensor receiving wall is sealed while crushing the seal member by pressurizing the sensor unit against to the sensor receiving wall with the pressurizing spring. Accordingly, when the sensor unit is separately assembled in advance and then the sensor unit is fitted into the container body, the assembly can be performed more simply than the case that the adhesive is used. In addition, since the deviation in size between the components can be absorbed by the use of the elasticity of the seal member, it is possible to satisfactorily perform the sealing work with simple assembly. Further, since a liquid reserving space sealed with the seal member is secured in the front (the opening side) of the sensor cavity, it is little affected by the wave motion of ink or the bubbles in the ink.

(7). The liquid container according to (6), wherein the sensor unit includes a sensor chip for detecting the liquid, a sensor base for supporting the sensor chip, and a unit base for supporting the sensor base, and wherein the pressurizing spring serves to give a pressurizing force to the unit base through the sensor base or the sensor chip.

According to the embodiment, the pressurizing force of the pressurizing spring is applied to the unit base through the sensor base or the sensor chip. Accordingly, for example, when the pressurizing force of the pressurizing spring is applied to the sensor chip, the surface pressure of the sealing surfaces between the sensor chip and the sensor base and between the sensor base and the unit base can be together enhanced, thereby enhancing the sealing ability therebetween. For example, when the pressurizing force of the pressurizing spring is applied to the sensor base, the surface pressure of the sealing surface between the sensor base and the unit base can be together enhanced, thereby enhancing the sealing ability therebetween. In the latter, since an unnecessary weight need not be applied to the sensor chip, the detection characteristic is little affected.

(8). The liquid container according to (7), wherein the sensor chip has a sensor cavity for receiving the liquid as a detection target, in which a lower face of the sensor cavity is opened so as to receive the liquid, an upper face thereof is closed with a vibration plate, and a piezoelectric element is disposed on an upper face of the vibration plate; the sensor base is a metal base body for mounting and fixing the sensor chip thereto, and the unit base is a resin base body for mounting and fixing the sensor base thereto, a lower face of the unit base being opposed to the sensor receiving wall with the seal member when the sensor unit is mounted on the sensor accommodating portion; and a liquid reserving space communicating with the sensor cavity is formed in the sensor base and the unit base and, a flow passage communicating with the liquid reserving space and the buffer chamber is provided at the inside of the ring-shaped seal member in the sensor receiving wall.

(9). The liquid container according to any one of (6) to (8), wherein the pressurizing spring is interposed between a wall of the sensor accommodating portion opposed to the sensor unit and the sensor unit in a compressed state.

According to the embodiment, since the pressurizing spring is accommodated in the sensor accommodating portion in a compressed state, the assembly work can be finished only by inserting the pressurizing spring into the sensor accommodating portion together with the sensor unit.

(10). The liquid container according to any one of (6) to (9), wherein a pressing cover is disposed above the sensor chip, and the pressurizing force of the pressurizing spring is given to the sensor base or the sensor chip through the pressing cover.

According to the invention, since the pressing cover is disposed above the sensor chip, it is possible to protect the sensor chip. In addition, since the weight of the pressurizing spring is applied to the sensor chip or the sensor base through the pressing cover, the degree of freedom in combination of the pressurizing spring and the sensor chip or the sensor base can be enhanced.

(11). The liquid container according to any one of (6) to (10), wherein a recessed portion is formed on the upper face of the unit base and the sensor base is accommodated in the recessed portion, the sensor chip and the sensor base are fixed to each other and sealed with an adhesive layer disposed on the upper face of the sensor base, and the sensor base and the unit base are fixed to each other and sealed with an adhesive film of which an inner periphery portion is bonded to the upper face of the sensor base through the adhesive layer therebetween and of which an outer periphery portion is bonded to the upper face wall around the recessed portion of the unit base.

According to the invention, only by inserting the sensor base mounted with the sensor chip into the unit base from the upside and bonding the adhesive film onto the upper faces of two arranged components, that is, on both upper faces of the sensor base and the unit base, the fixation and sealing between two components made of different materials (the metal sensor base and the resin unit base) can be simultaneously carried out. Accordingly, the workability of assembly is very excellent. Since the adhesive film is bonded to two components, the sealing between the components can be carried out without being affected by the size accuracy of the components. For example, when the adhesive film is heated, pressed, and then fused by the use of a mass production machine, the sealing ability can be improved only by managing the temperature and pressure of the mass production machine, thereby accomplishing the stabilization at the time of mass production. Since the adhesive film having a large influence on the sealing ability can be easy in applicability and excellent in space efficiency, it is possible to accomplish the decrease in size of the sensor unit.

(12). The liquid container according to (11), wherein the upper face of the sensor base protrudes upwardly from the recessed portion of the unit base and the adhesive film is bonded to the upper face of the sensor base at a position higher than the bonding position on the upper face wall around the recessed portion of the unit base.

According to the embodiment, since the height of the film bonding face on the unit base is set lower than the height of the film bonding face on the sensor base, the sensor base can be pressed with the adhesive film by a level difference, thereby strengthening the fixing force of the sensor base to the unit base. It causes these components to be assembled without rattled.

(13). The liquid container according to any one of (6) to (10), wherein the sensor base and the unit base have an entrance-side flow passage and an exit-side flow passage with respect to the sensor cavity, respectively, as the liquid reserving space; and the container body has an upstream buffer chamber communicating with the upstream side of the delivery passage and the entrance-side flow passage and a downstream buffer chamber communicating with the downstream side of the delivery passage and the exit-side flow passage, as the buffer chamber, and wherein the liquid flowing from the upstream side of the delivery passage is supplied to the sensor cavity through the upstream buffer chamber and the entrance-side flow passage and is discharged to the downstream side of the delivery passage through the exit-side flow passage and the downstream buffer chamber from the sensor cavity.

According to the embodiment, since the liquid flowing from the upstream side of the delivery passage in the container body is supplied to the sensor cavity through the upstream buffer chamber and the entrance-side flow passages of the unit base and the sensor base and is discharged to the downstream side of the delivery passage through the exit-side flow passages of the sensor base and the unit base and the downstream buffer chamber from the sensor cavity, the liquid always flows in the sensor cavity. Accordingly, it is possible to prevent the erroneous detection due to the staying of the liquid or bubbles in the sensor cavity.

(14). A liquid container comprising: a container body having a liquid reservoir therein and a delivery passage for sending out liquid from the reservoir; a sensor accommodating portion disposed in the container body in the vicinity of the terminal of the delivery passage; a sensor unit which is disposed in the sensor accommodating portion so as to detect the liquid; buffer chambers which are disposed in the container body, are adjacent to the sensor accommodating portion through a sensor receiving wall, and are disposed in series in the delivery passage so as to communicate with the upstream side and the downstream side of the delivery passage; a ring-shaped seal member having elasticity and sealing a space between the sensor unit and the sensor receiving wall; and a pressurizing spring for pressurizing the sensor unit against the sensor receiving wall to press the seal member and to give a surface pressure necessary for sealing the seal member, the sensor unit, and the sensor receiving wall, wherein the sensor unit includes: a sensor chip having a sensor cavity for receiving the liquid as a detection target, in which a lower face of the sensor cavity is opened so as to receive the liquid, an upper face thereof is closed with a vibration plate, and a piezoelectric element is disposed on the upper face of the vibration plate; a metal sensor base for mounting and fixing the sensor chip thereto; and a resin unit base for mounting and fixing the sensor base thereto, in which a lower face of the unit base is opposed to the sensor receiving wall with the seal member therebetween when the sensor unit is mounted on the sensor accommodating portion, wherein a liquid reserving space communicating with the sensor cavity is formed in the sensor base and the unit base and a flow passage communicating with the liquid reserving space and the buffer chamber is provided at the inside of the ring-shaped seal member in the sensor receiving wall, and wherein the pressurizing spring serves to give the pressurizing force only to the unit base through a force delivering passage bypassing the sensor base and the sensor chip of the sensor unit.

According to the embodiment, the ring-shaped seal member having elasticity is disposed between the sensor unit and the sensor receiving wall and the space between the sensor unit and the sensor receiving wall is sealed while crushing the seal member by pressurizing the sensor unit against the sensor receiving wall with the pressurizing spring. Accordingly, when the sensor unit is separately assembled in advance and then the sensor unit is fitted into the container body, the assembly work can be performed more simply than the case that the adhesive is used. In addition, since the deviation in size between the components can be absorbed by the use of the elasticity of the seal member, it is possible to satisfactorily perform the sealing work with simple assembly. Further, since a liquid reserving space sealed with the seal member is secured in the front (the opening side) of the sensor cavity, it is little affected by the wave motion of ink or the bubbles in the ink. Furthermore, since the pressurizing force of the pressurizing spring is applied directly to the unit base opposed to the sensor receiving wall, the pressurizing force can be prevented from acting on the sensor base or the sensor chip, thereby enhancing the detection accuracy.

(15). The liquid container according to (14), wherein the pressurizing spring is interposed between the wall of the sensor accommodating portion opposed to the sensor unit and the sensor unit in a compressed state.

According to the embodiment, since the pressurizing spring is accommodated in the sensor accommodating portion in a compressed state, the assembly work can be finished only by inserting the pressurizing spring into the sensor accommodating portion together with the sensor unit.

(16). The liquid container according to (14) or (15), wherein a pressing cover is disposed above the unit base to cover the sensor chip without contacting the sensor chip and the sensor base, and the pressurizing force of the pressurizing spring is given to the unit base through the pressing cover.

According to the embodiment, since the pressing cover is disposed above the unit base, it is possible to protect the sensor chip and the sensor base. In addition, since the weight of the pressurizing spring is applied to the unit base through the pressing cover, the degree of freedom in combination of the pressurizing spring and the unit base can be enhanced.

(17). The liquid container according to (14), wherein a cover member for covering the sensor chip and the sensor base is mounted above the unit base without directly contacting the unit base, the cover member is fixed to the container body with a screw, and the pressurizing spring is interposed between the cover member and the unit base in a compressed state.

According to the embodiment, since the pressing cover is disposed above the unit base, it is possible to protect the sensor chip and the sensor base. In addition, since the cover member is fixed to the container body with screws and the pressurizing spring is disposed between the cover member and the unit base with a compressed posture, it is possible to compactly assemble the pressurizing spring.

(18) The liquid container according to (17), wherein the pressurizing spring is composed of a leaf spring and the leaf spring is formed integrally with a terminal plate electrically connected to an electrode of the sensor chip.

According to the embodiment, since the pressurizing spring is composed of a leaf spring and the leaf spring is formed integrally with a terminal plate electrically connected to an electrode of the sensor chip, it is possible to perform a compact assembly work and to reduce the number of components, thereby reducing the number of assembly steps.

(19) The liquid container according to any one of (14) to (18), wherein a recessed portion is formed on the upper face of the unit base and the sensor base is accommodated in the recessed portion; the sensor chip and the sensor are fixed to each other and sealed with an adhesive layer disposed on the upper face of the sensor base; and the sensor base and the unit base are fixed to each other and sealed with an adhesive film of which an inner periphery portion is bonded to the upper face of the sensor base with the adhesive layer therebetween and of which an outer periphery portion is bonded to the upper face wall around the recessed portion of the unit base.

According to the embodiment, only by inserting the sensor base mounted with the sensor chip into the unit base from the upside and bonding the adhesive film onto the upper faces of two arranged components, that is, on both upper faces of the sensor base and the unit base, the fixation and sealing between two components made of different materials (the metal sensor base and the resin unit base) can be simultaneously carried out. Accordingly, the workability of assembly is very excellent. Since the adhesive film is bonded to two components, the sealing between the components can be carried out without being affected by the size accuracy of the components. For example, when the adhesive film is heated, pressed, and then fused by the use of a mass production machine, the sealing ability can be improved only by managing the temperature and pressure of the mass production machine, thereby accomplishing the stabilization at the time of mass production. Since the adhesive film having a large influence on the sealing ability can be easy in applicability and excellent in space efficiency, it is possible to accomplish the decrease in size of the sensor unit.

(20). The liquid container according to (19), wherein the upper face of the sensor base protrudes upwardly from the recessed portion of the unit base and the adhesive film is bonded to the upper face of the sensor base at a position higher than the bonding position on the upper face wall around the recessed portion of the unit base.

According to the embodiment, since the height of the film bonding face on the unit base is set lower than the height of the film bonding face on the sensor base, the sensor base can be pressed with the adhesive film by a level difference, thereby strengthening the fixing force of the sensor base to the unit base. It causes these components to be assembled without rattled.

(21). The liquid container according to any one of (14) to (20), wherein the sensor base and the unit base have an entrance-side flow passage and an exit-side flow passage for the sensor cavity, respectively, as the liquid reserving space; and the container body has an upstream buffer chamber communicating with the upstream side of the delivery passage and the entrance-side flow passage and a downstream buffer chamber communicating with the downstream side of the delivery passage and the exit-side flow passage, as the buffer chamber, and wherein the liquid flowing from the upstream side of the delivery passage is supplied to the sensor cavity through the upstream buffer chamber and the entrance-side flow passage and is discharged to the downstream side of the delivery passage through the exit-side flow passage and the downstream buffer chamber from the sensor cavity.

According to the embodiment, since the liquid flowing from the upstream side of the delivery passage in the container body is supplied to the sensor cavity through the upstream buffer chamber and the entrance-side flow passages of the unit base and the sensor base and is discharged to the downstream side of the delivery passage through the exit-side flow passages of the sensor base and the unit base and the downstream buffer chamber from the sensor cavity, the liquid always flows through the sensor cavity. Accordingly, it is possible to prevent the erroneous detection due to the staying of the liquid or bubbles in the sensor cavity.

DETAILED DESCRIPTION OF THE INVENTION

A liquid detecting device according to an embodiment of the invention and an ink cartridge (a liquid container) comprising the liquid detecting device will be described below with reference to the drawings.

Figure 1:
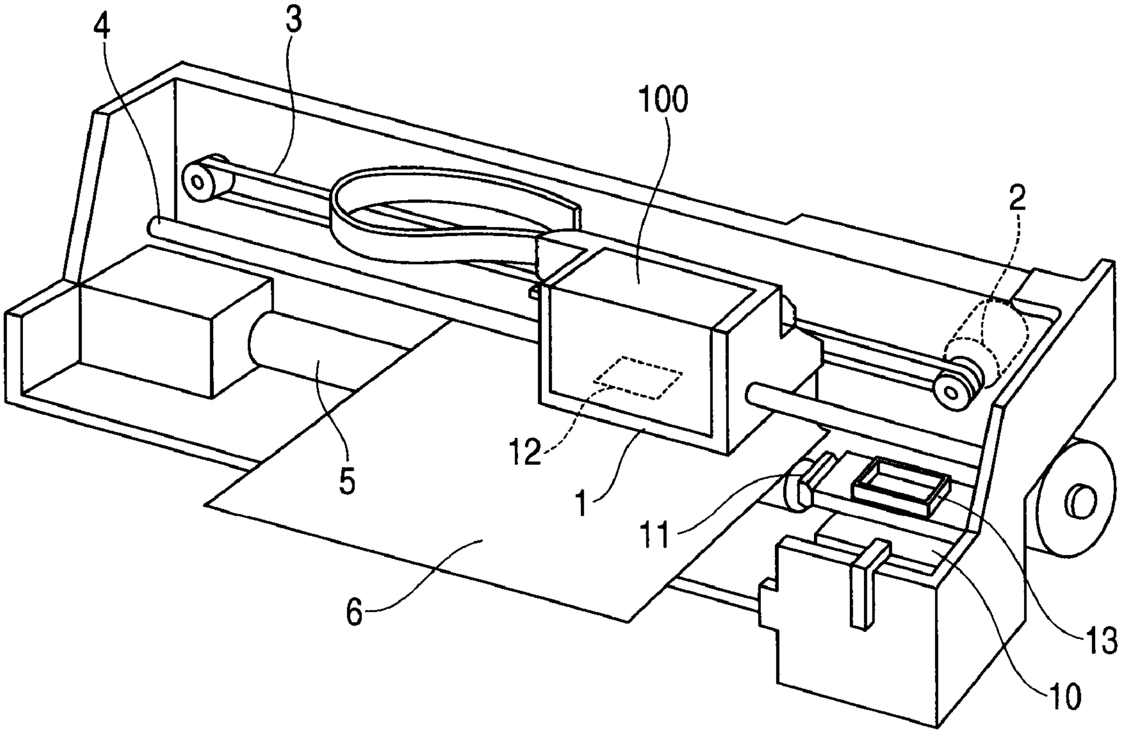
FIG. 1 is a perspective view showing a schematic structure of a recording apparatus of an ink jet type (a liquid ejecting apparatus) in which an ink cartridge (a liquid container) according to an embodiment of the invention is used.

FIG. 1 shows a schematic structure of a recording apparatus of an ink jet type (a liquid ejecting apparatus) in which the ink cartridge according to the embodiment is used. In FIG. 1, the reference numeral 1 denotes a carriage. The carriage 1 is constituted to be guided by a guide member 4 and reciprocated in an axial direction of a platen 5 through a timing belt 3 to be driven by a carriage motor 2.

A recording head 12 of an ink jet type is mounted on a side of the carriage 1 which is opposed to a recording paper 6, and an ink cartridge 100 for supplying an ink to the recording head 12 is removably attached to an upper part thereof.

A cap member 13 is disposed in a home position to be a non-printing region of the recording apparatus (a right side in the drawing). The cap member 13 has such a structure as to be pushed against a nozzle forming surface of the recording head 12 and to form a hermetic closed space together with the nozzle forming surface when the recording head 12 mounted on the carriage 1 is moved to the home position. A pump unit 10 for applying a negative pressure to the hermetic closed space formed by the cap member 13 to execute cleaning is disposed below the cap member 13.

Moreover, wiping means 11 including an elastic plate such as a rubber is disposed in the vicinity of a printing region side in the cap member 13 so as to be freely moved forward and backward in a horizontal direction with respect to a moving track of the recording head 12, for example, and has such a structure as to freely sweep away the nozzle forming surface of the recording head 12 if necessary when the carriage 1 is reciprocated toward the cap member 13 side.

Figure 2:
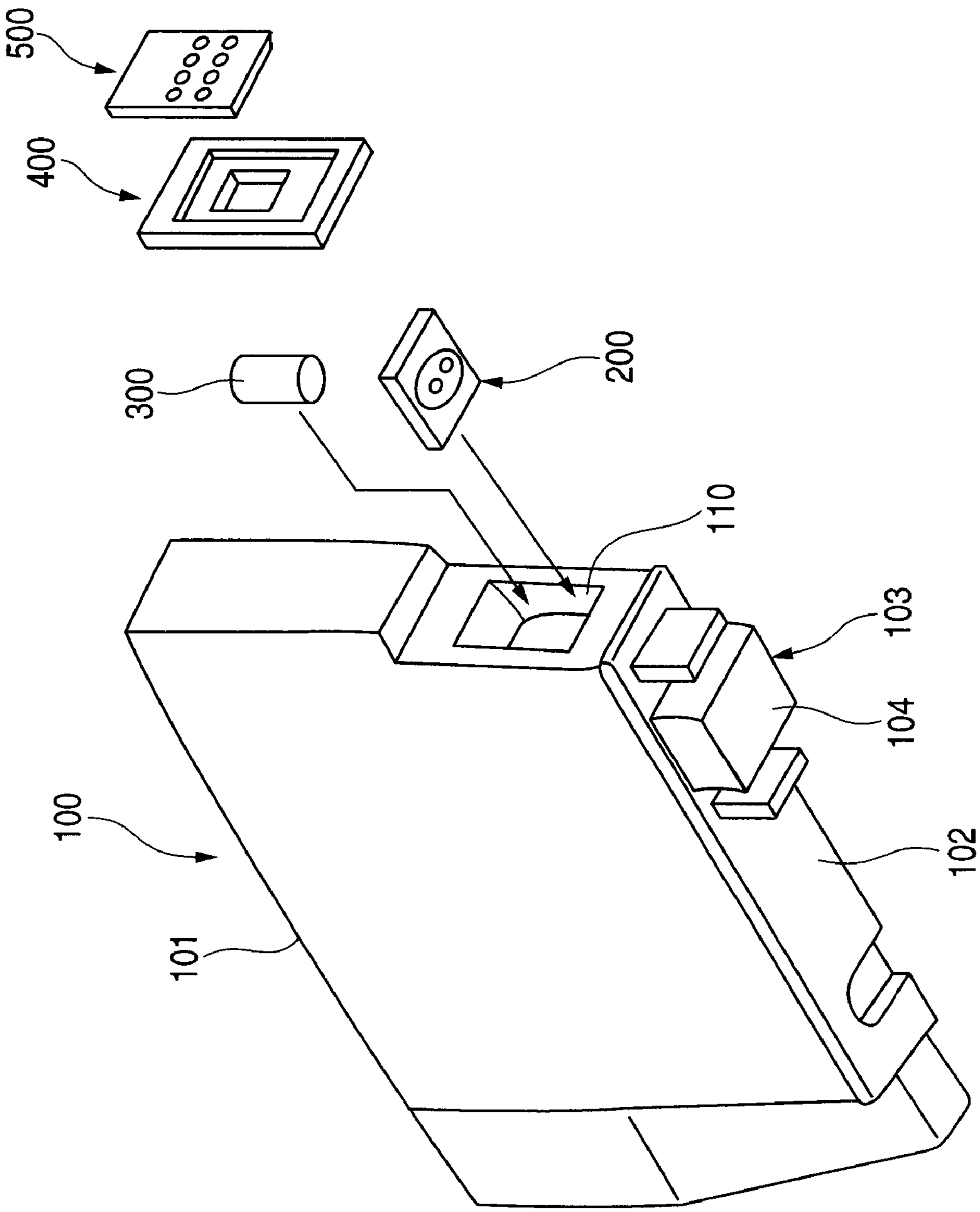
FIG. 2 is an exploded perspective view showing a schematic structure of the ink cartridge according to the embodiment of the invention.

FIG. 2 is a perspective view showing a schematic structure of the ink cartridge 100. The ink cartridge 100 includes a sensor unit 200 to be the liquid detecting device according to the embodiment.

The ink cartridge 100 has a cartridge case (a container body) 101 formed of a resin which includes an ink storage portion and a cover 102 formed of a resin which is attached to cover a lower end face of the cartridge case 101. The cover 102 is provided for protecting various sealing films stuck to the lower end face of the cartridge case 101. An ink delivery portion 103 is protruded from the lower end face of the cartridge case 101 and a cover film 104 for protecting an ink delivery port (not shown) is stuck to the lower end face of the ink delivery portion 103.

Moreover, a sensor accommodating recessed portion 110 for accommodating the sensor unit 200 is provided on a side face having a small width in the cartridge case 101, and the sensor unit 200 and a spring 300 are accommodated in the sensor accommodating recessed portion 110. The spring 300 pushes the sensor unit 200 against a sensor receiving wall 120 positioned in an inner bottom part of the sensor accommodating recessed portion 110 to crush a sealing ring 270, thereby maintaining a sealing property between the sensor unit 200 and the cartridge case 101.

The sensor accommodating recessed portion 110 is opened on a side face having a small width in the cartridge case 101, and the sensor unit 200 and the spring 300 are inserted from the opening on the side face. The opening on the side face of the sensor accommodating recessed portion 110 is closed with a sealing cover 400 having a board 500 from an outside in a state in which the sensor unit 200 and the spring 300 are accommodated therein.

Figure 3:
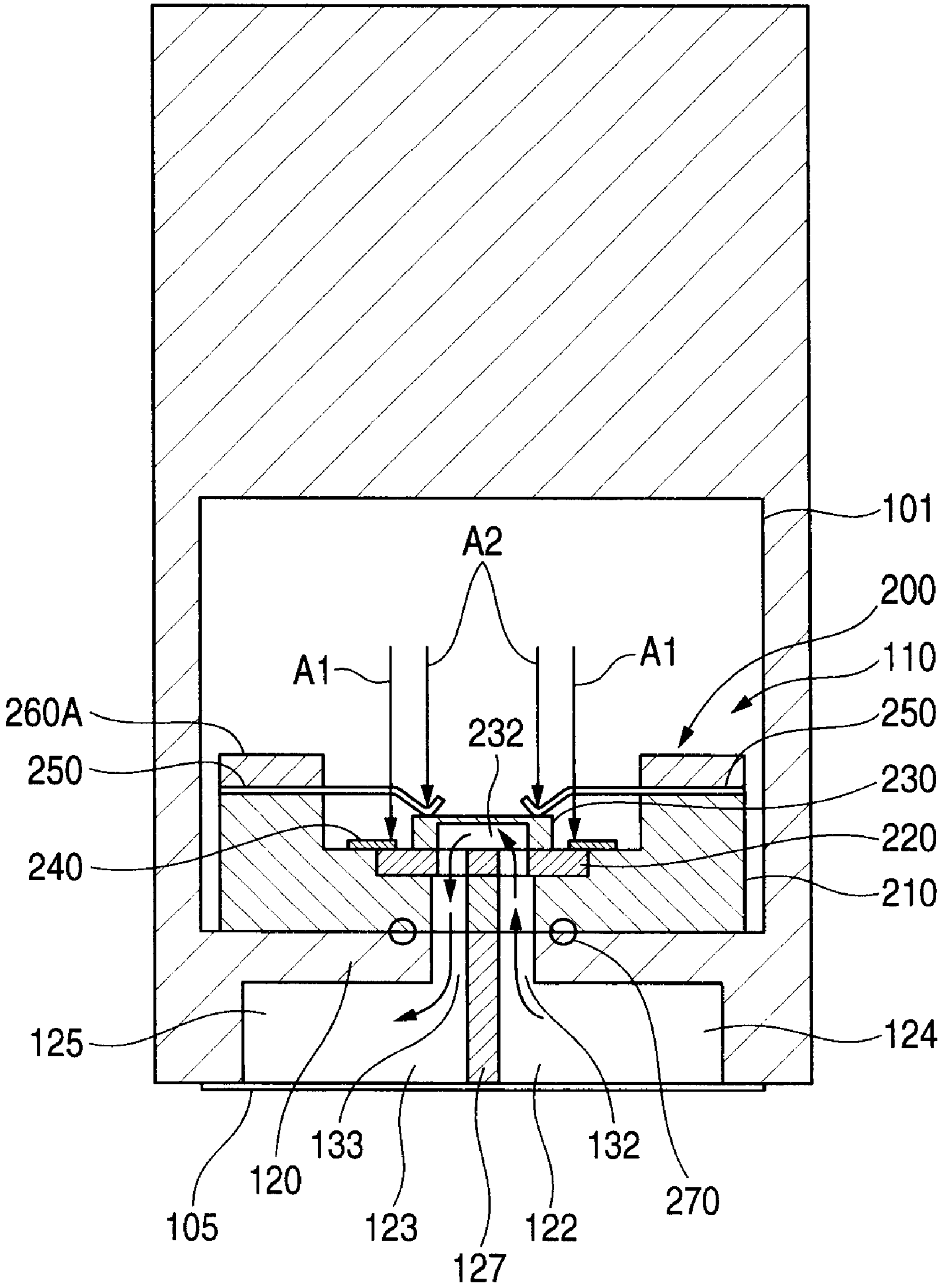
FIG. 3 is a cross-sectional view illustrating a portion where a sensor unit is fitted to the ink cartridge, as seen from the front side.
Figure 4:
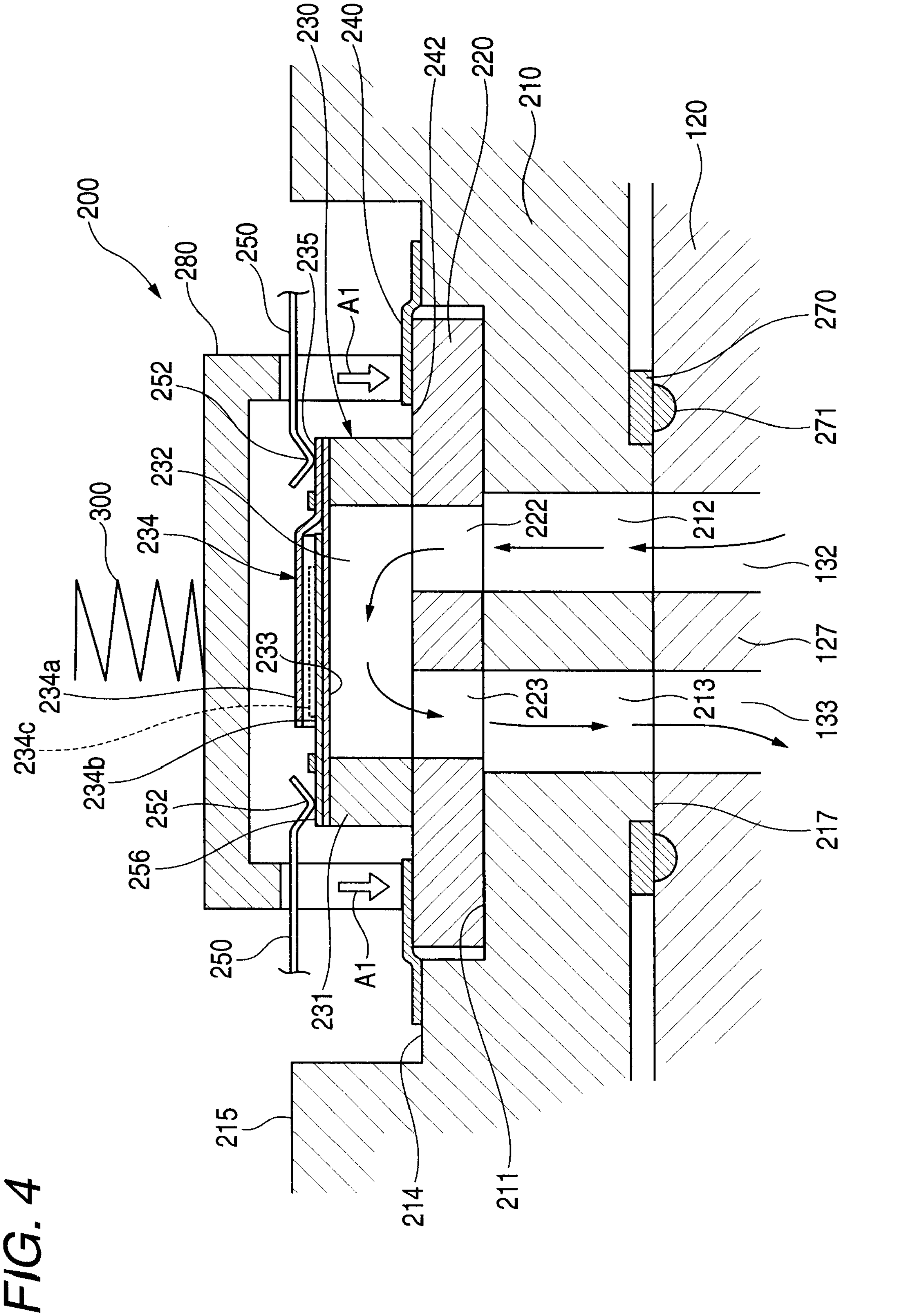
FIG. 4 is an enlarged view illustrating important parts of an ink cartridge according to a first embodiment of the invention.

FIG. 3 is a cross-sectional view illustrating a portion where the sensor unit 200 and the spring 300 are inserted into the sensor accommodating recessed portion 110, as seen from the front side, and FIG. 4 is an enlarged view illustrating an example of important parts of an ink cartridge according to a first embodiment of the invention. In FIG. 3, some parts including the spring 300 are not shown. The first embodiment of the invention will be described below.

The sensor receiving wall 120 for receiving the lower end of the sensor unit 200 is provided on the inner bottom portion of the sensor accommodating recessed portion 110 of the cartridge case 101. The sensor unit 200 is placed on the flat upper face of the sensor receiving wall 120 and is a portion on which the seal ring (ring-shaped seal member) 270 at the lower end of the sensor unit 200 is pressed with an elastic force of the spring 300.

A pair of upstream and downstream sensor buffer chambers 122 and 123, which are horizontally partitioned by a partition wall 127, are provided below the sensor receiving wall 120. The sensor receiving wall 120 is provided with a pair of communication holes (flow passages) 132 and 133 to correspond to the sensor buffer chambers 122 and 123. A delivery passage for delivering the reserved ink, which is not shown, is provided inside the cartridge case 101 and the sensor unit 200 is provided in the vicinity of the terminal (in the vicinity of the ink delivery port) of the delivery passage.

In this case, the upstream buffer chamber 122 communicates with the upstream side of the delivery passage through an opening 124 (not shown particularly) and the downstream sensor buffer chamber 123 communicates with the downstream side of the delivery passage close to the ink delivery port through a communication hole 125 (not shown particularly). The lower faces of the sensor buffer chambers 122 and 123 are opened, not closed with a rigid wall, and the opening is covered with a seal film 105 made of resin.

The sensor unit 200 includes a resin unit base 210 of a plate shape having a recessed portion 211 thereon, a metal sensor base 220 of a plate shape received in the recessed portion 211 on the upper face of the unit base 210, a sensor chip 230 mounted on and fixed to the upper face of the sensor base 220, an adhesive film 240 for fixing the sensor base 220 to the unit base 210, a pair of terminal plates 250 disposed on the unit base 210, a pressing member 260A of a plate shape for pressurizing the terminal plates 250, a rubber seal ring 270 disposed on the lower face of the unit base 210, and a pressing cover 280 disposed on the upper face of the sensor base 220 to cover the sensor chip 230 so as to apply the weight of the spring 300 to the unit base 210.

Describing details of the respective elements, as shown in FIG. 4, the unit base 210 includes the recessed portion 211 into which the sensor base 220 is inserted at the center of the upper face thereof, as a base body for supporting the sensor base 220, and an mounting wall 215 having a height greater by a step than that of the upper face wall 214 at the outside of the upper face wall 214 around the recessed portion 211. The lower face of the recessed portion 211 is provided with an entrance-side flow passage 212 and an exit-side flow passage 213 (liquid reserving space) including circular openings. The lower face of the unit base 210 is provided with a projected portion 217 at outer periphery of which the seal ring 270 is fitted and the entrance-side flow passage 212 and the exit-side flow passage 213 are positioned on the projected portion 217. The seal ring 270 is formed of a rubber ring packing and has a ring-shaped projected portion 271 having a semi-circular section on the lower face thereof.

The sensor base 220 is formed of a metal plate such as stainless steel having rigidity greater than that of resin so as to enhance an acoustic characteristic of a sensor. The sensor base 220 includes an entrance-side flow passage 222 and an exit-side flow passage 223 (liquid reserving space) composed of two openings to correspond to the entrance-side flow passage 212 and the exit-side flow passage 213 of the unit base 210.

An adhesive layer 242 is formed on the upper face of the sensor base 220, for example, by attachment of a double-sided adhesive film or application of adhesive. The sensor chip 230 is mounted on and fixed to the adhesive layer 242. That is, the sensor base 220 serves as a base body for supporting the sensor chip 230.

The sensor chip 230 has a sensor cavity 232 for receiving ink (liquid) which is a detection target and has a structure that the lower face of the sensor cavity 232 is opened so as to receive the ink, the upper face is closed with a vibration plate 233, and a piezoelectric element 234 is disposed on the upper face of the vibration plate 233.

Specifically, the sensor chip 230 includes a ceramic chip body 231 having the sensor cavity 232 of a circular opening shape at the center thereof, the vibration plate 233 which is formed on the upper face of the chip body 231 to constitute the bottom wall of the sensor cavity, the piezoelectric element 234 stacked on the vibration plate 233, and terminals 235 and 236 stacked on the chip body 231.

The piezoelectric element 234 includes upper and lower electrode layers 234*a* and 234*b* connected to the terminals 235 and 236, respectively, and a piezoelectric layer 234*c* formed between the upper and lower electrode layers 234*a* and 234*b*. The piezoelectric element serves to detecting the ink end, for example, on the basis of difference in characteristic due to existence or non-existence of the ink in the sensor cavity 232. The piezoelectric element 234*c* may be made of lead zirconate titanate (PZT), lead lanthanum zirconate titanate (PLZT), or a leadless piezoelectric film not containing lead.

The sensor chip 230 is integrally fixed to the sensor base 220 with the adhesive layer 242 by placing the lower face of the chip body 231 on the upper center of the sensor base 220. At the same time, the space between the sensor base 220 and the sensor chip 230 is sealed with the adhesive layer 242. The entrance-side flow passages 222 and 212 and the exit-side flow passages 223 and 213 (liquid reserving spaces) of the sensor base 220 and the unit base 210 communicate with the sensor cavity 232 of the sensor chip 230. Accordingly, the ink enters the sensor cavity 232 through the entrance-side flow passages 212 and 222 and is discharged from the sensor cavity 232 through the exit-side flow passages 223 and 213.

In this way, the metal sensor base 220 mounted with the sensor chip 230 is received in the recessed portion 211 on the upper face of the unit base 210. Then, the sensor base 220 and the unit base 210 are integrally fixed to each other by covering them with a resin adhesive film 240 from the upside thereof.

That is, the adhesive film 240 has an opening 241 at the center thereof and thus exposes the sensor chip 230 to the central opening 241 by covering them with the adhesive film in the state where the sensor base 220 is accommodated in the recessed portion 211 on the upper face of the unit base 210. By bonding the inner periphery portion of the adhesive film 240 to the upper face of the sensor base 220 through the adhesive layer 242 and bonding the outer periphery portion to the upper face wall 214 around the recessed portion 211 of the unit base 210, that is, by bonding the adhesive film 240 to the upper faces of two components (the sensor base 220 and the unit base 210), the sensor base 220 and the unit base 210 are fixed to each other and sealed.

In this case, the upper face of the sensor base 220 is projected upwardly from the recessed portion 211 of the unit base 210 and the adhesive film 240 is bonded to the upper face of the sensor base 220 at a position higher than the bonding position of the upper face wall 214 around the recessed portion 211 of the unit base 210. In this way, by setting the height of the film bonding face on the sensor base 220 to be higher than the height of the film bonding face on the unit base 210, the sensor base 220 can be pressed with the adhesive film 240 by level difference, thereby strengthening the fixing force of the sensor base 220 to the unit base 210. It causes these components to be assembled without rattled.

The respective terminal plates 250 have a spring piece 252 projected from a middle side edge of a base strip and are disposed on the upper face of the mounting wall 215 of the unit base 210. By placing the pressing member 260 thereon, the terminal plates 250 are interposed between the unit base 210 and the pressing member 260 and in this state, the spring members 252 are in electrical contact with the terminals 235 and 236 on the upper face of the sensor chip 230. The pressing member 260 has a flat frame shape which is placed on the upper face of the mounting walls 215 of the unit base 210 with the terminal plates 250 therebetween.

As shown in FIG. 4, the pressing cover 280 is disposed above the sensor chip 230 without contacting the sensor chip 230 and the spring members 252 of the terminal plates 250. The pressing cover 280 serves to protect the sensor chip 230 and to deliver the weight of the spring 300 (indicated by an arrow Al in FIGS. 3 and 4) to the upper face of the sensor base 220 to bypass the sensor chip 230. The bottom of the pressing cover is placed on the portion to which the adhesive film 240 is bonded and the weight Al of the spring 300 can be applied to the sensor base 220 from the upside of the adhesive film 240. When the weight Al of the spring 300 is applied to the sensor base 220, the weight Al is delivered to the unit base 210 below and serves as a force for pressing the seal ring 270.

In this case, the seal ring 270 is designed to have a diameter as small as possible so as not to unnecessarily enlarge the sealing space and is positioned right under the sensor base 220 or the sensor chip 230. Therefore, by applying the weight Al of the spring 300 to the sensor base 220 having a small area, the pressurizing force of the spring 300 effectively acts on the seal ring 270 right under the sensor base.

The sensor unit 200 has the above-mentioned configuration and is accommodated in the sensor accommodating recessed portion 110 (sensor accommodating portion) of the cartridge case 100 together with the compressed spring 300. In this accommodated state, by pressurizing the pressing cover 280 with the spring 300, the weight Al delivered to the unit base 210 through the sensor base 220 presses the seal ring 270 disposed on the lower face of the unit base 210 and brings the seal ring into close contact with the sensor receiving wall 120 in the sensor accommodating recessed portion 110. Accordingly, the sealing property is secured between the sensor unit 200 and the cartridge case 101.

Under the condition that the sealing property is secured by the above-mentioned assembly, the upstream buffer chamber 122 in the cartridge case 101 communicates with the entrance-side flow passages 212 and 222 in the sensor unit 200 through the communication hole 132 of the sensor receiving wall 120 and the downstream buffer chamber 123 in the cartridge case 101 communicates with the exit-side flow passages 213 and 223 in the sensor unit 200 through the communication hole 133 of the sensor receiving wall 120. The entrance-side flow passages 212 and 222, the sensor cavity 232, and the exit-side flow passages 213 and 223 are arranged in series in the delivery passage in the cartridge case 101 in that order from the upstream side.

Here, the upstream flow passages communicating with the sensor cavity 232 includes the upstream buffer chamber 122 having a large flow-passage section, the communication hole 132, and the entrance-side flow passages 212 and 222 in the sensor unit 200 having a small flow-passage section (upstream narrow flow passage). The downstream flow passage communicating with the sensor cavity 232 includes the downstream buffer chamber 123 having a large flow-passage section, the communication hole 133, and the exit-side flow passages 213 and 223 in the sensor unit 200 having a small flow-passage section (downstream narrow flow passage).

According to the embodiment described above, since the space between the sensor unit 200 and the sensor receiving wall 120 is sealed while pressing the seal ring 270 by interposing the seal ring 270 having elasticity between the sensor unit 200 and the sensor receiving wall 120 and pressurizing the sensor unit 200 against the sensor receiving wall 120 by the use of the spring 300, an assembly order that the sensor unit 200 is separately assembled in advance and then the sensor unit 200 is fitted into the cartridge case 101 later can be employed. Accordingly, the assembly can be carried out more simply than the case employing an adhesive.

Since the deviation in size between the sensor unit 200 and the sensor receiving wall 120 can be absorbed with the elasticity of the seal ring 270, it is possible to carry out the reliable sealing with simple assembly. Since the liquid reserving space (the entrance-side flow passages 212 and 222 and the exit-side flow passages 213 and 223) sealed with the seal ring 270 is secured in the front of (at the opening side) the sensor cavity 232, it is little affected by the wave motion of ink or the bubbles in the ink.

Since the pressurizing force of the spring 300 is applied to the unit base 210 through the sensor base 220, the surface pressure of the sealing surface between the sensor base 220 and the unit base 210 can be together enhanced, thereby enhancing the sealing property therebetween. That is, since the weight of the spring 300 is applied to the adhesive film 240 on the upper face of the sensor base 220, the adhesive film 240 can be more strongly bonded, thereby improving the sealing ability. In this case, since the unnecessary weight is not applied to the sensor chip 230, the detection characteristic is not affected thereby.

Since the weight A1 of the spring 300 is delivered to the sensor base 220 through the pressing cover 280, it is possible to protect the sensor chip 230 which is an important element and to freely determine combinations of the spring 300 and the sensor base 220, thereby enabling an easy design.

Since it is sufficient only if the spring 300 can be received in the sensor accommodating recessed portion 110 in the state that it is compressed, the spring 300 can be easily inserted together with the sensor unit 200.

In addition, only by inserting the sensor base 220 mounted with the sensor chip 230 into the unit base 210 from the upside and bonding the adhesive film 240 onto the upper faces of the two arranged components, that is, on both upper faces of the sensor base 220 and the unit base 210, the fixation and sealing between two components made of different materials (the metal sensor base 220 and the resin unit base 210) can be simultaneously carried out. Accordingly, the workability of assembly is very excellent. Since the adhesive film 240 is bonded to two components, the sealing between the components can be carried out without being affected by the size accuracy of the components. For example, when the adhesive film 240 is heated, pressed, and then fused by the use of a mass production machine, the sealing ability can be improved only by managing the temperature and pressure of the mass production machine, thereby accomplishing the stabilization at the time of mass production. Since the adhesive film 240 having a large influence on the sealing ability can be easy in application and excellent in space efficiency, it is possible to accomplish decrease in size of the sensor unit 200.

Since the entrance-side flow passages 212 and 222 and the exit-side flow passages 213 and 223 of the sensor cavity 232 are formed in the sensor base 220 and the unit base 210, respectively, and the ink flows in the sensor cavity 232 through the entrance-side flow passages 212 and 222 and is discharged through the exit-side flow passages 213 and 223, the ink always passes through the sensor cavity 232, thereby preventing erroneous detection due to the liquid or bubbles staying in the sensor cavity 232.

Since the height of the bonding face of the adhesive film 240 with respect to the unit base 210 is set to be smaller than the height of the bonding face with respect to the sensor base 220, the sensor base 220 can be pressed with the adhesive film 240 by level difference, thereby strengthening the fixing force of the sensor base 220 to the unit base 210. They may be provided without level difference.

Since the sensor unit 200 is disposed in the vicinity of the terminal of the delivery passage in the cartridge case 101 and the entrance-side flow passages 212 and 222, the sensor cavity 232, and the exit-side flow passages 213 and 223 of the sensor unit 200 are disposed in series in the delivery passage in that order from the upstream side, it is possible to accurately detect the amount of remaining liquid in the ink cartridge 100.

Figure 5:
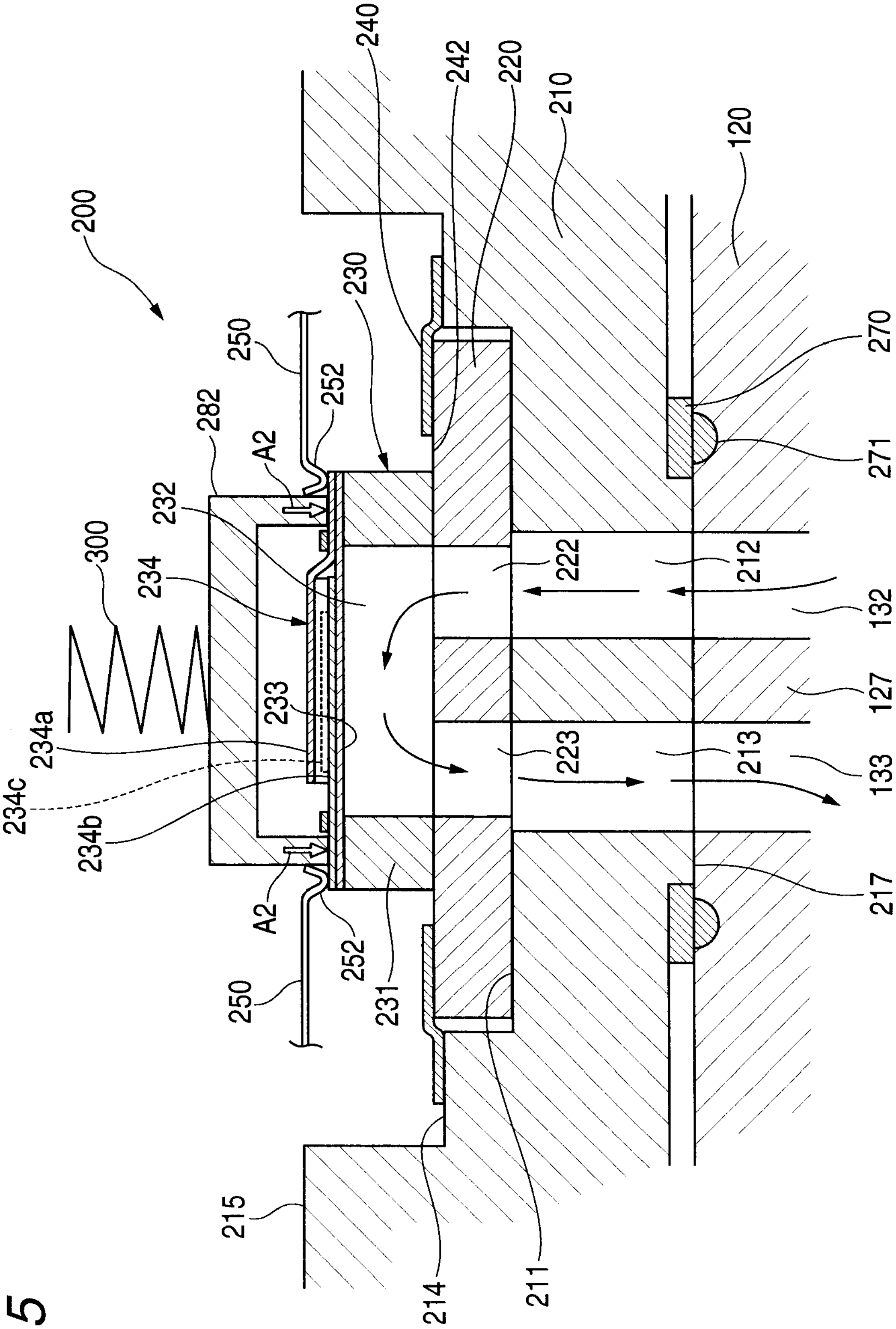
FIG. 5 is an enlarged view illustrating important parts of an ink cartridge according to a second embodiment of the invention.

FIG. 5 shows configurations of important parts of an ink cartridge according to a second embodiment the invention. In FIG. 5, the elements similar to those of the embodiment shown in FIGS. 1 to 4 are denoted by the same reference numerals and description thereof will be omitted.

In the first embodiment, the weight A1 of the spring 300 is applied to the sensor base 220 through the pressing cover 280, but in the second embodiment, the weight A2 of the spring 300 is applied to the chip body 231 of the sensor chip 230 through the pressing cover 282. As a result, the weight A2 of the spring 300 can be delivered to the unit base 210 through the pressing cover 282, the chip body 231 of the sensor chip 230, and the sensor base 220 and can serve as a force pressing the seal ring 270 (that is, a force for securing the sealing ability).

In this case, the pressing cover 282 is pressed on the chip body 231 at the position not unnecessarily affecting the vibration plate 233 or the piezoelectric element 234. At this time, the pressing cover should not hinder the contact between the spring members 252 of the terminal plates 250 and the terminals 235 and 236 of spring members 252. For this reason, by bringing the bottom of the pressing cover 282 into contact with the chip body 231 at the position other than the contact portion between the spring members 252 and the terminals 235 and 236 or by pressurizing the bottom of the pressing cover 282 onto the chip body 231 from the upside of the spring members 252 contacting the terminals 235 and 236, the spring members 252 can come in close contact with the terminals 235 and 236 with the force of the spring 300 acting on the pressing cover 282.

In this way, even when the weight A2 of the spring 300 is applied to the chip body 231 of the sensor chip 230, the advantages similar to the above-mentioned embodiment can be obtained.

Next, an ink cartridge (liquid container) according to a third embodiment will be described with reference to the drawings.

Figure 6:
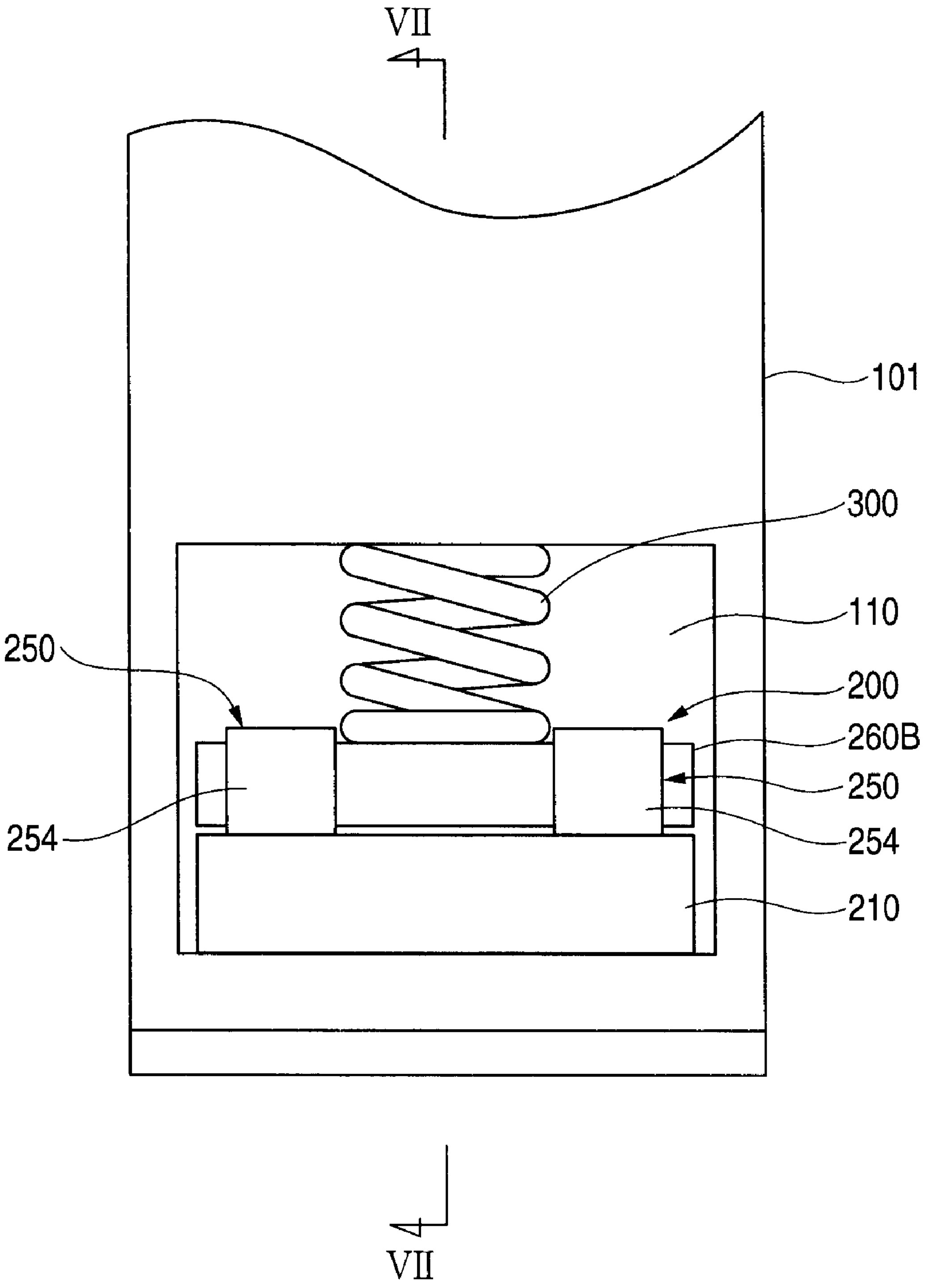
FIG. 6 is a front view illustrating a portion where a sensor unit is fitted to an ink cartridge according to a third embodiment of the invention.
Figure 7:
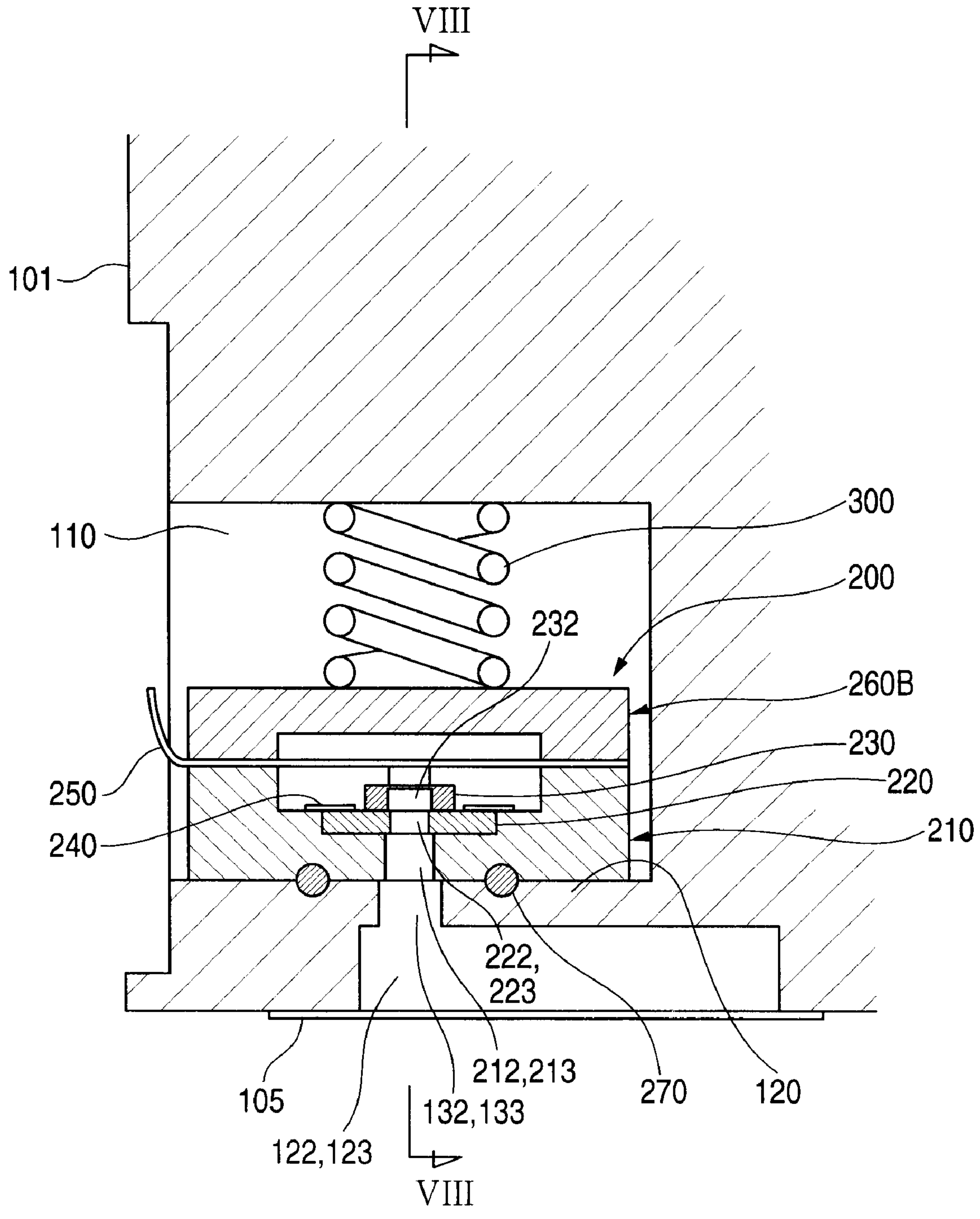
FIG. 7 is a cross-sectional view taken along Arrow VII-VII of FIG. 6.
Figure 8:
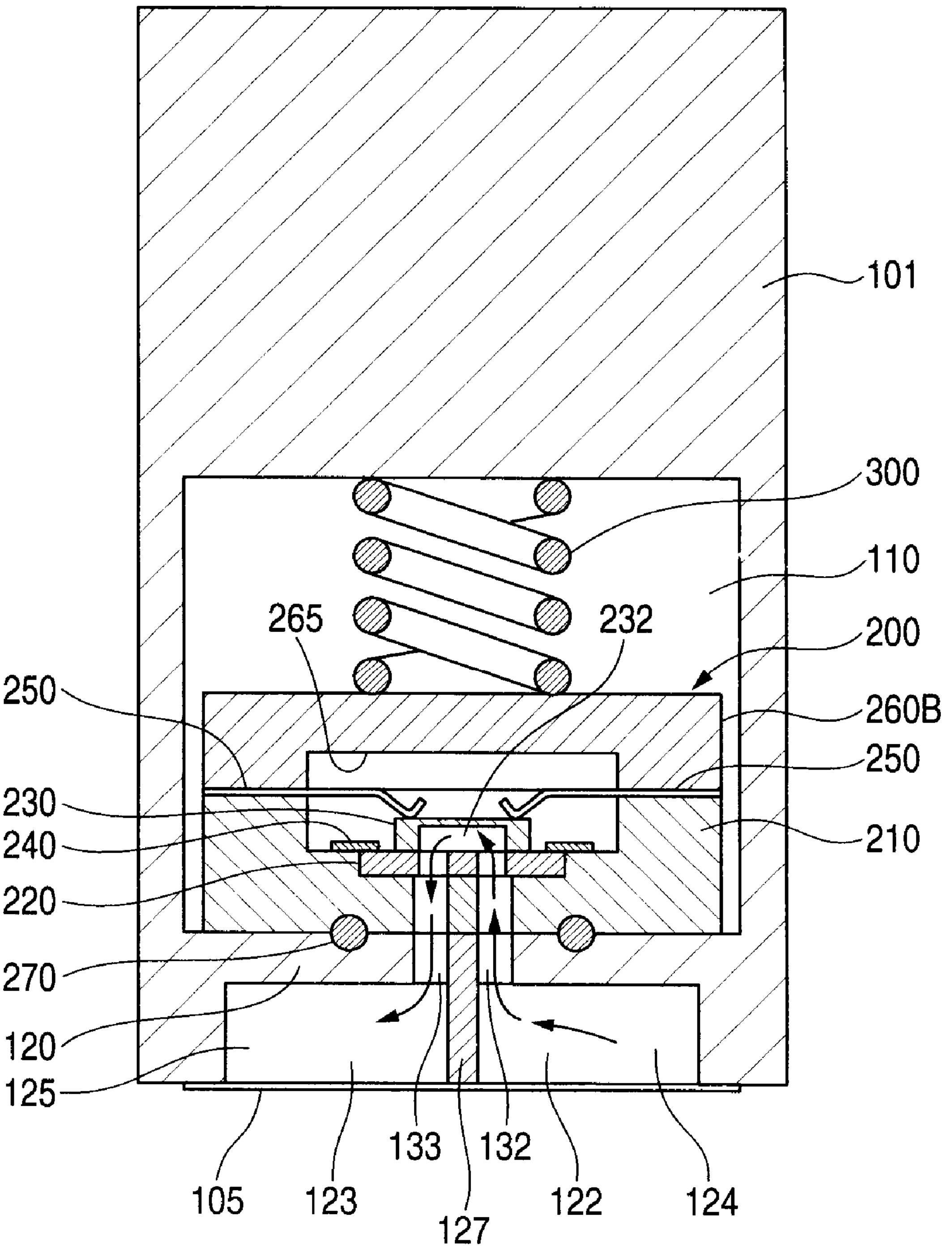
FIG. 8 is a cross-sectional view taken along Arrow VIII-VIII of FIG. 7.
Figure 9:
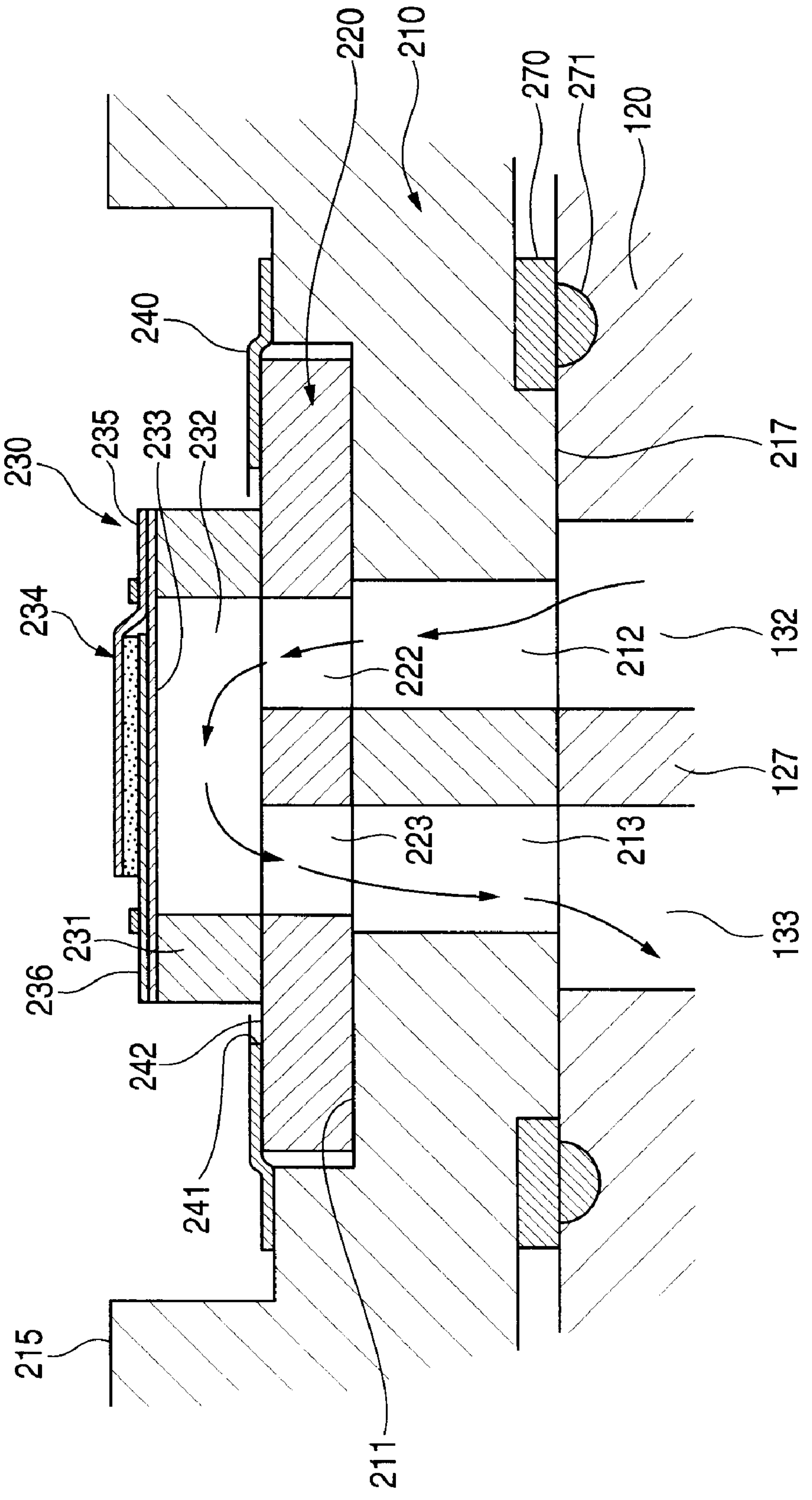
FIG. 9 is an enlarged view illustrating important parts of FIG. 8.

FIG. 6 is a front view illustrating a portion where the sensor unit 200 and the spring 300 are inserted into the sensor accommodating recessed portion 110, FIG. 7 is a cross-sectional view taken along Arrow VII-VII of FIG. 6, FIG. 8 is a cross-sectional view taken along Arrow VIII-VIII of FIG. 7, and FIG. 9 is an enlarged view illustrating important parts of FIG. 8. In the drawings, the elements similar to the first embodiment described above are denoted by the same reference numerals and description thereof will be omitted.

In the first and second embodiments the invention, the weight of the spring 300 is applied to the sensor base 220 or the chip body 231 through the pressing covers 280 or 282, respectively. However, in the third embodiment, the weight of the spring 300 is applied to the unit base 210 through a pressing member 260B.

Specifically, the sensor unit 200 includes a resin unit base 210 of a plate shape having a recessed portion 211 on the upper face thereof, a metal sensor base 220 of a plate shape accommodated in the recessed portion 211 on the upper face of the unit base 210, a sensor chip 230 mounted on and fixed to the upper face of the sensor base 220, an adhesive film 240 for fixing the sensor base 220 to the unit base 210, a pair of terminal plates 250 disposed on the unit base 210, a pressing member 260B of a plate shape for pressurizing the terminal plates 250 and protecting the sensor chip 230, and a rubber seal ring 270 disposed on the lower face of the unit base 210.

Describing details of the respective elements, as shown in FIG. 9, the unit base 210 includes the recessed portion 211 into which the sensor base 220 is inserted at the center of the upper face thereof and an mounting wall 215 having a height greater by a step than that of the upper face wall 214 at the outside of the upper face wall 214 around the recessed portion 211. The bottom wall of the recessed portion 211 is provided with an entrance-side flow passage 212 and an exit-side flow passage 213 (liquid reserving spaces) including circular openings. The lower face of the unit base 210 is provided with a projected portion 217 at outer periphery of which the seal ring 270 is fitted and the entrance-side flow passage 212 and the exit-side flow passage 213 are positioned on the projected portion 217. The seal ring 270 is formed of a rubber ring packing and has a ring-shaped projected portion 271 having a semi-circular section on the lower face thereof.

The respective terminal plates 250 have a spring piece 252 projected from a middle side edge of a base strip and a bent piece 254 formed at the end of the strip, which are disposed on the upper face of the mounting wall 215 of the unit base 210. By placing the pressing member 260B thereon, the terminal plates 250 are interposed between the unit base 210 and the pressing member 260B and in this state, the spring members 252 are in electrical contact with the terminals 235 and 236 on the upper face of the sensor chip 230.

The pressing member 260B has a flat plate shape which is placed on the upper face of the mounting walls 215 of the unit base 210 with the base portions 251 of the terminal plates 250 interposed therebetween and includes a recessed portion 265 which is disposed on the lower face thereof to avoid interference with the spring members 252 of the terminal plates 250 or the sensor chip 230. The pressing member 260B is placed on the upper face of the unit base 210 while pressurizing the terminal plates 250 from the upside, thereby protecting the sensor base 220 and the sensor chip 230 accommodated in the recessed portion 211 on the upper face of the unit base 210.

The sensor unit 200 has the above-mentioned configuration and is accommodated in the sensor accommodating recessed portion 110 of the cartridge case 100 together with the spring 300 in the state where the spring is compressed. In the accommodated state, by downwardly pressurizing the pressing member 260B with the spring 300, the seal ring 270 disposed on the lower face of the sensor unit 200 is pressed onto the sensor receiving wall 120 in the sensor accommodating recessed portion 110, thereby securing the sealing property between the sensor unit 200 and the cartridge case 101. In this case, since the pressurizing force of the spring 300 is delivered to the unit base 210 through the pressing member 260B, the pressurizing force is not applied to the sensor base 220 and the sensor chip 230 at all. That is, the spring 300 gives the pressurizing force only to the unit base 210 through a force delivery path bypassing the sensor base 220 and the sensor chip 230.

According to the second embodiment described above, the advantages similar to the first embodiment can be obtained. In addition, since the pressurizing force of the spring 300 passes through the pressing member 260B but is applied directly to the unit base 210 opposed to the sensor receiving wall 120, the influence of the pressurizing force cannot be given to the sensor base 220 or the sensor chip 230, thereby enhancing the detection sensitivity.

Further, since it is sufficient only if the spring 300 is compressed and accommodated in the sensor accommodating recessed portion 110, the spring can be easily inserted together with the sensor unit 200.

Since the pressing member 260B is disposed on the unit base 210, it is possible to protect the sensor chip 230 and the sensor base 210 which are important elements for the vibration characteristic. Since the weight of the spring 300 is applied to the unit base 210 through the pressing member 260B, it is possible to freely determine the combinations of the spring 300 and the-unit base 210, thereby enabling easy design.

Figure 10:
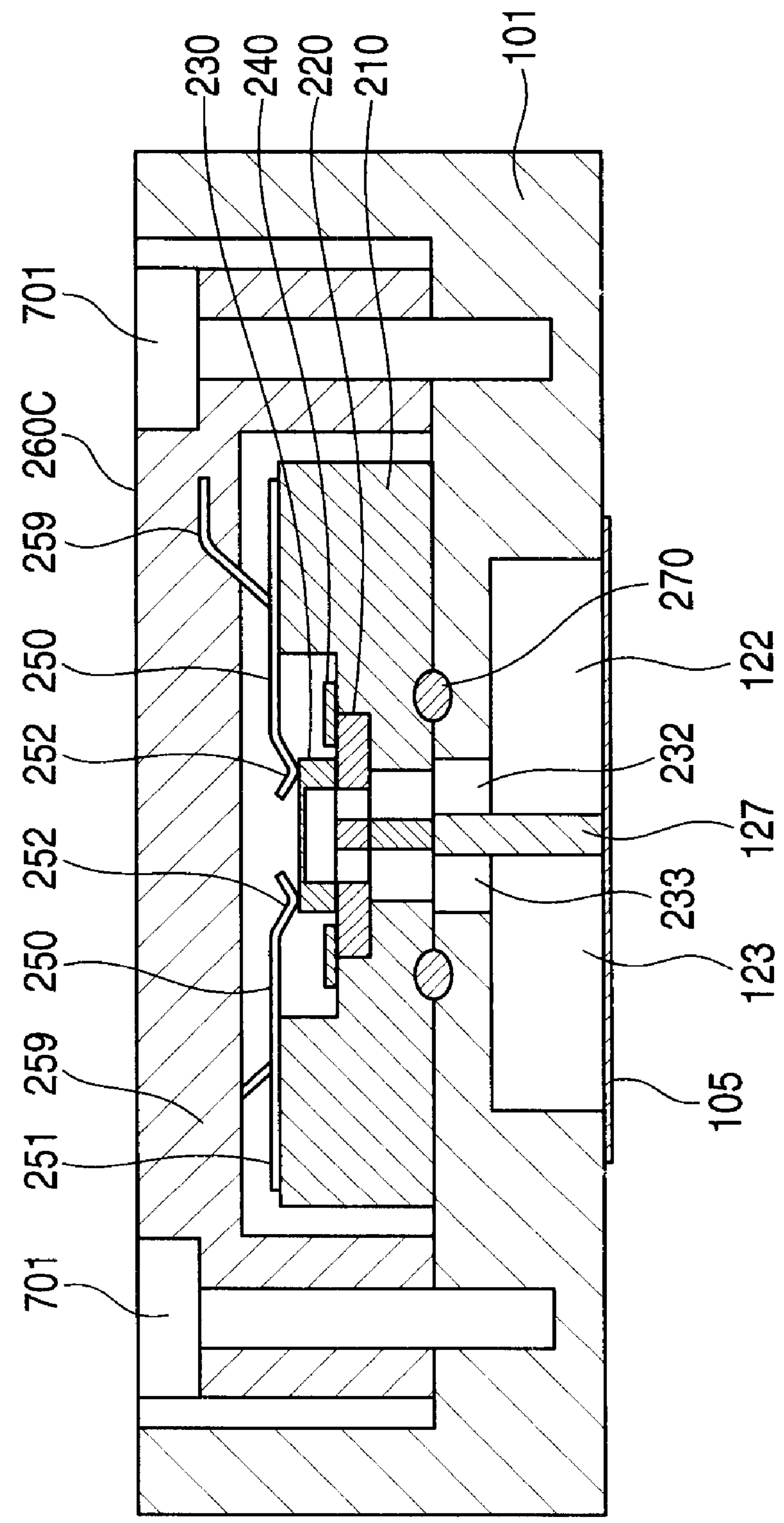
FIG. 10 is a cross-sectional view illustrating important parts of an ink cartridge according to a fourth embodiment of the invention.

FIG. 10 shows important parts of an ink cartridge according to a fourth embodiment of the invention. In FIG. 10, the elements similar to the embodiments shown in FIGS. 1 to 9 are denoted by the same reference numerals and description thereof will be omitted.

In the fourth embodiment, a pressing member 260C covering the sensor chip 230 and the sensor base 210 is disposed above the unit base 210 so as not to come in contact with the unit base 210 and the pressing member 260C is fixed to the cartridge case 101 with screws 701. Leaf springs (pressurizing springs) 259 for pressurizing the unit base 210 to press the seal ring 270 are interposed between the pressing member 260C and the unit base 210, in the state where the leaf spring is compressed.

In this case, the leaf springs 259 are integrally formed in the respective terminal plates 250 and may apply a predetermined pressurizing force only to the unit base 210 in a regular assembling process. The terminal plates 250 are provided with the spring members 252 coming in elastic contact with the terminals 235 and 236 (see FIG. 10) of the sensor chip 230, but the leaf springs 259 are disposed at the positions where the spring force thereof does not act on the spring members 252 at all.

As shown in the figure, an end of the respective leaf springs 259 may be inserted at the time of forming the pressing member 260C and the terminal plates 250 may be integrally formed in the pressing member 260C. In this case, it is not necessary to particularly support the terminal plates 250.

The leaf springs 259 may be manufactured and provided separately from the terminal plates 250 and pressurizing springs other than the leaf springs 259 may be provided as long as the space permits.

In this way, since the pressing member 260C is fixed to the cartridge case 101 with the screws 701 and the leaf springs 259 (pressurizing springs) are interposed between the cover member 260C and the unit base 210 in the state where the leaf springs are compressed, it is possible to perform the compact assembly of the pressurizing springs. Further, since the leaf springs 259 are integrally formed with the terminal plates 250 electrically connected to the terminals 235 and 236 of the sensor chip 230, it is possible to perform the compact assembly and to reduce the number of components, thereby reducing the number of assembly steps.

Figure 11:
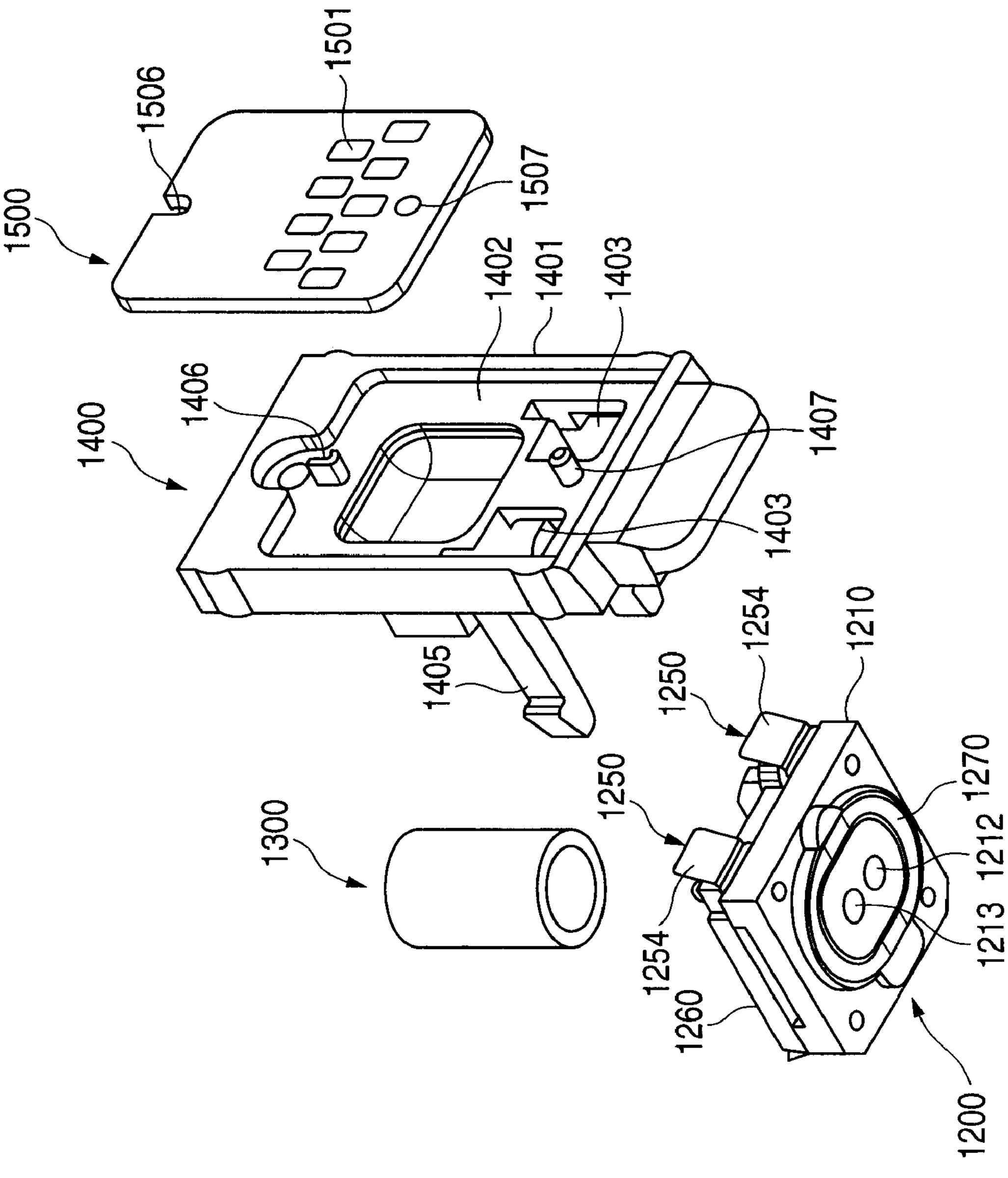
FIG. 11 is a perspective view showing detailed structures of components including a sensor unit (a liquid detecting device) mountable in an ink cartridge according to a fifth embodiment of the invention.
Figure 12:
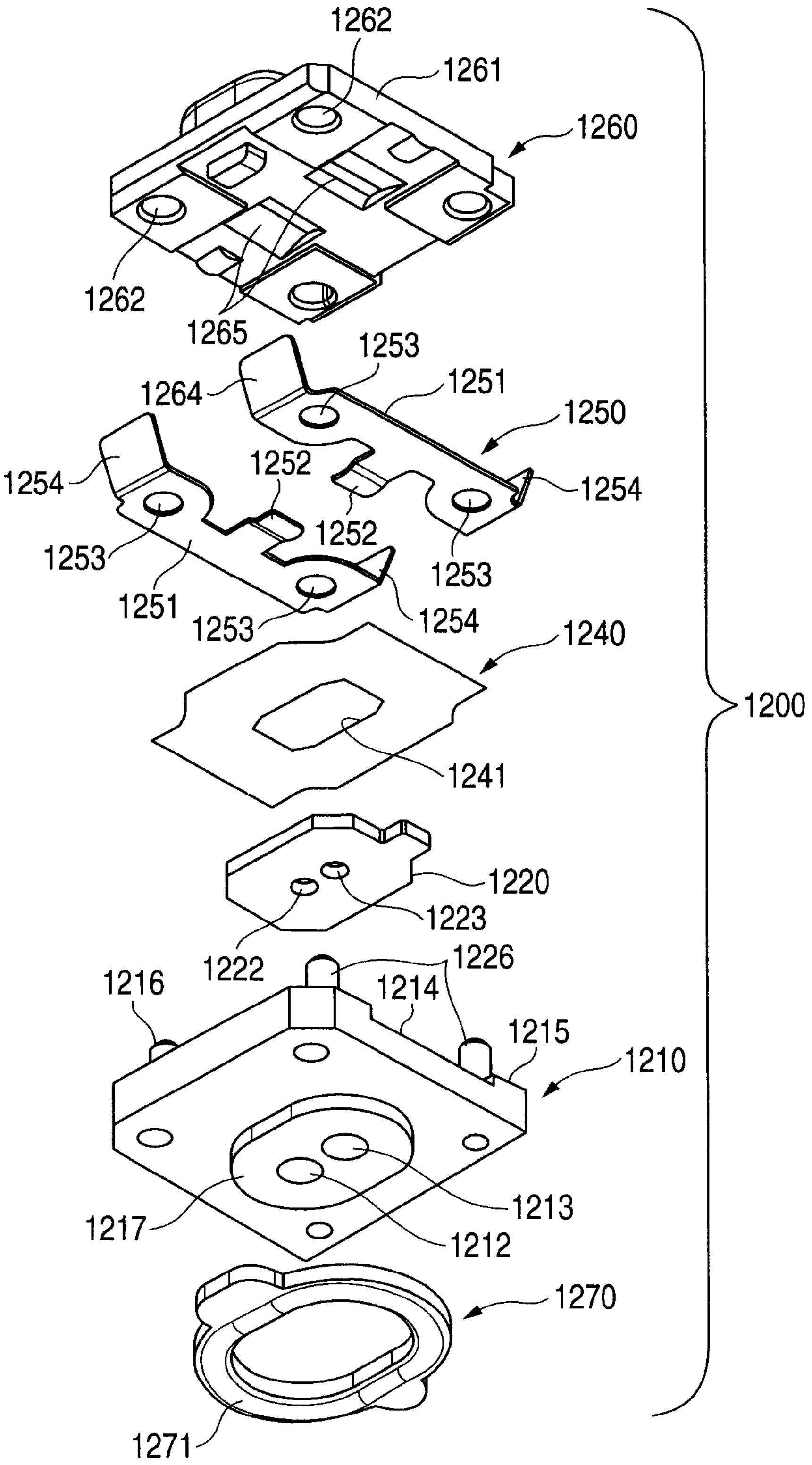
FIG. 12 is an exploded perspective view showing the sensor unit in FIG. 11.
Figure 13:
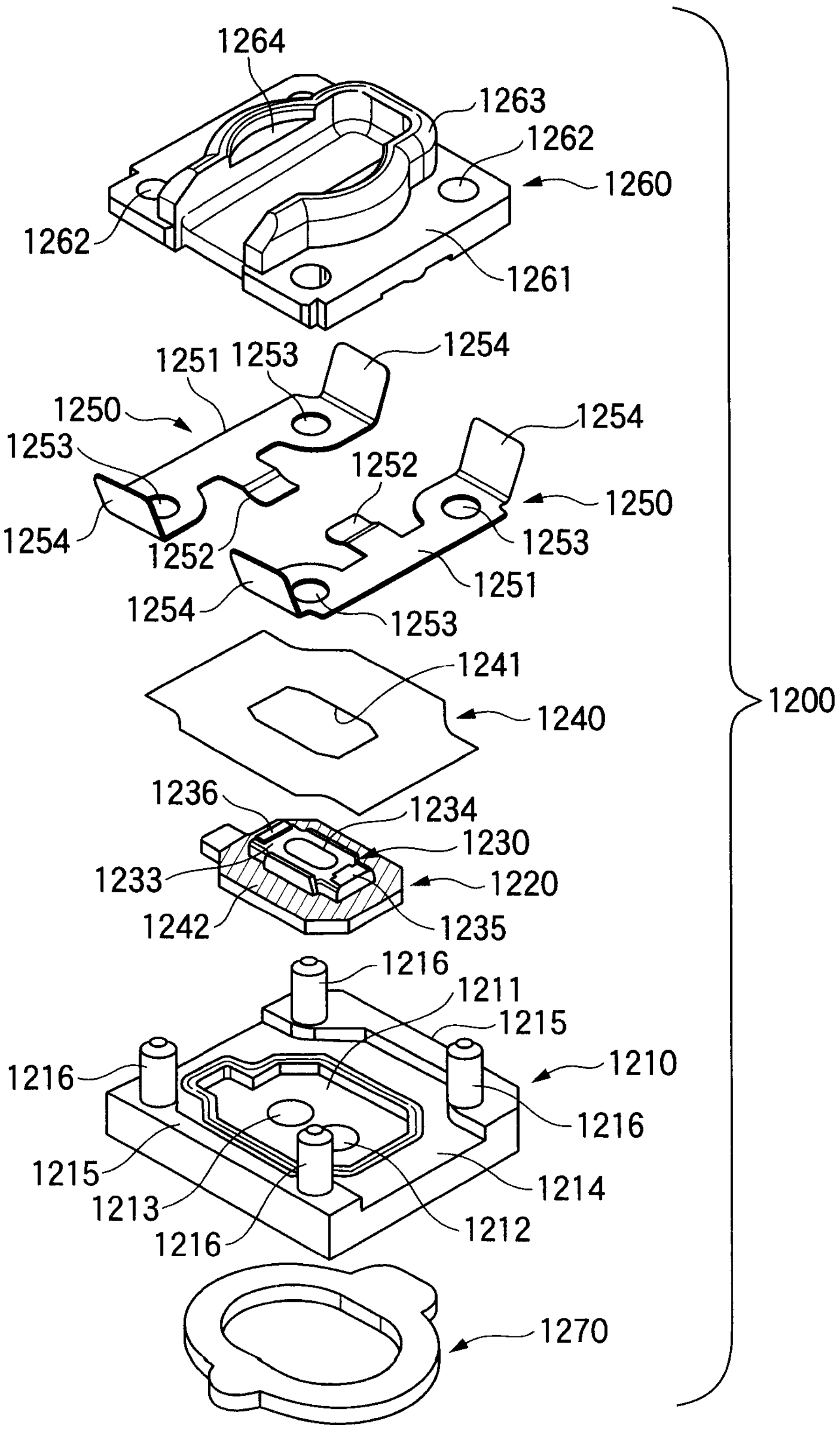
FIG. 13 is an exploded perspective view showing the sensor unit in FIG. 11 as seen at another angle.
Figure 14:
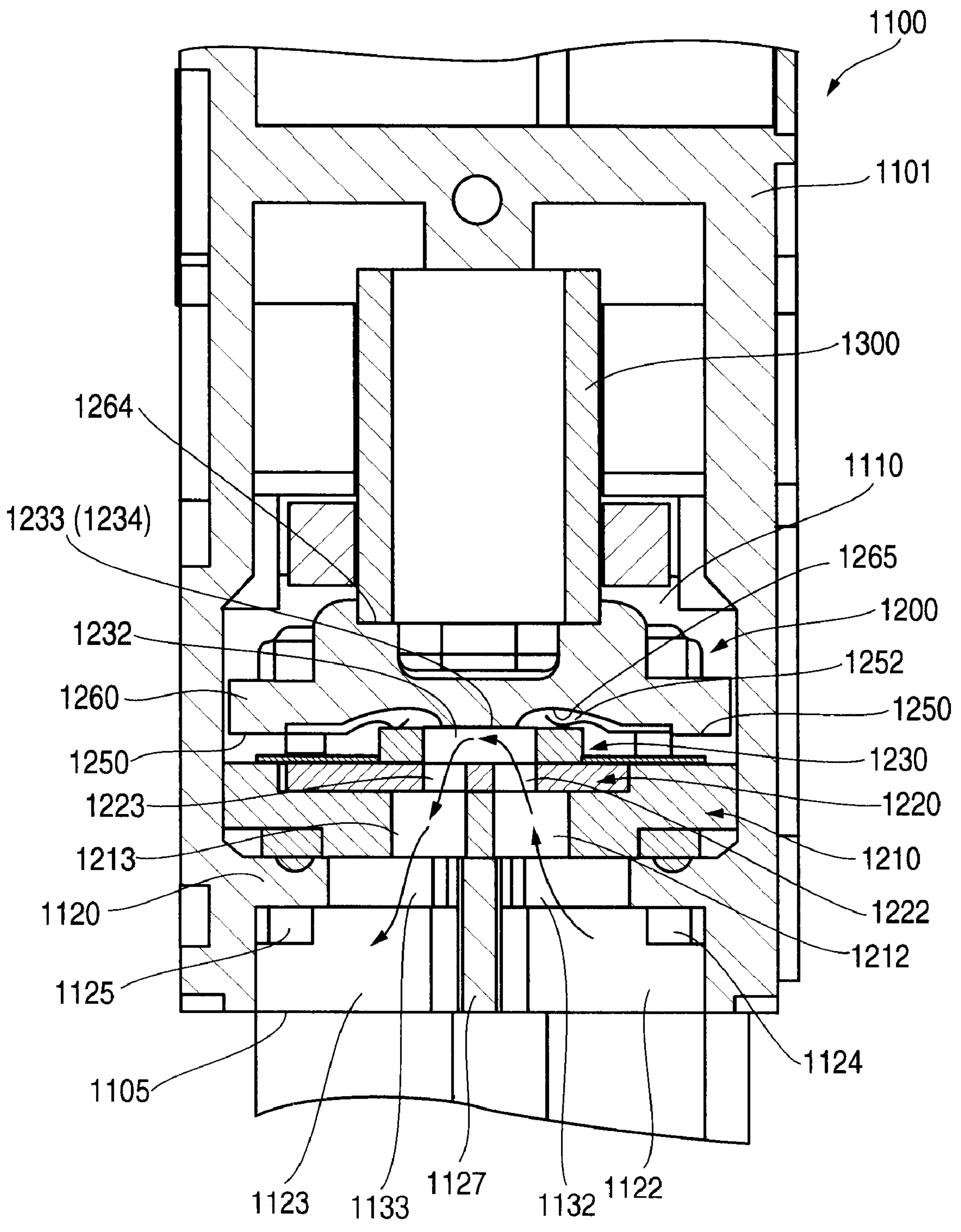
FIG. 14 is a longitudinal sectional view showing a portion to which the sensor unit of the ink cartridge according to the fifth embodiment of the invention is attached.
Figure 15:
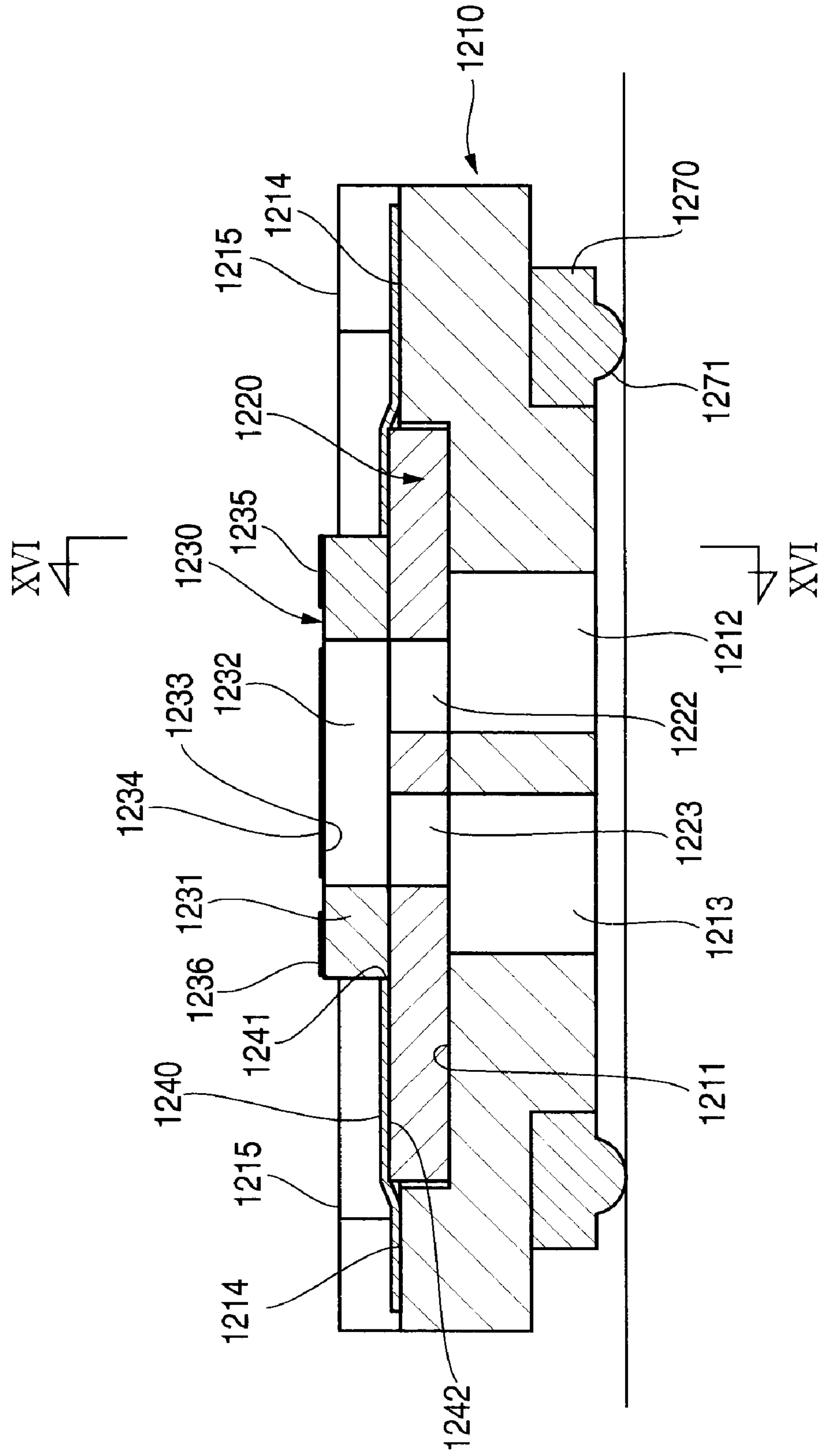
FIG. 15 is an enlarged sectional view showing a main part of the sensor unit in FIG. 14.
Figure 16:
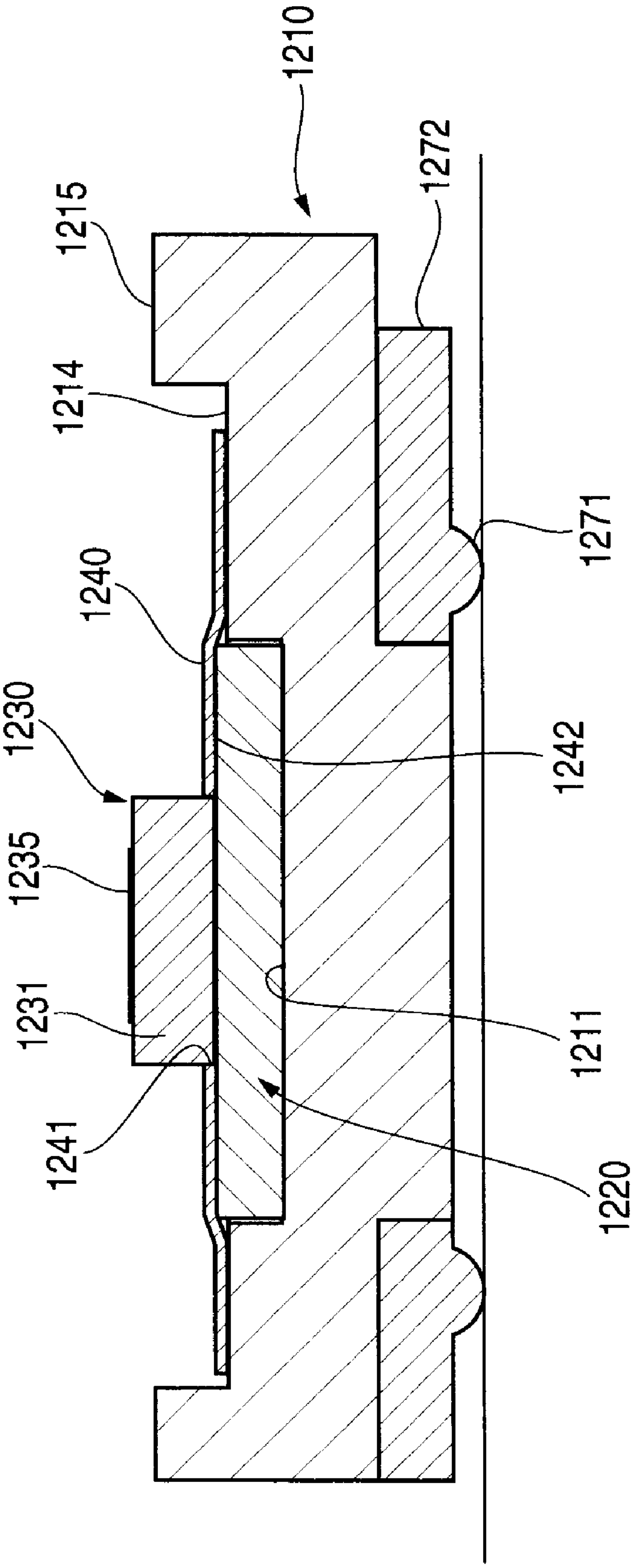
FIG. 16 is a sectional view taken along a XVI-XVI line in FIG. 15.

Next, an ink cartridge according to a fifth embodiment will be described bellow. FIG. 11 is an exploded perspective view showing each of structures of a sensor unit 1200, a spring 1300, a sealing cover 1400 and a board 1500, which can be accommodated in the ink cartridge. Moreover, FIG. 12 is an exploded perspective view showing the sensor unit 1200, FIG. 13 is an exploded perspective view showing the sensor unit 1200 seen at another angle, and FIG. 14 is a longitudinal sectional view showing the sensor unit accommodating portion of the ink cartridge 1100. Moreover, FIG. 15 is a sectional view showing a main part of the sensor unit 1200 and FIG. 16 is a sectional view taken along a XVI - XVI line in FIG. 15.

As shown in FIG. 14, the sensor receiving wall 1120 for receiving a lower end of the sensor unit 1200 is provided in the inner bottom part of the sensor accommodating recessed portion 1110 of the cartridge case 1101. The sensor receiving wall 1120 has an upper face mounting the sensor unit 1200 thereon and is a portion with which the seal ring 1270 provided on a lower end of the sensor unit 1200 comes in pressure contact by an elastic force of the spring 1300.

A pair of sensor buffer chambers 1122 and 1123 on upstream and downstream sides which are divided from each other with a partition wall 1127 interposed therebetween are provided on a lower side of the sensor receiving wall 1120, and the sensor receiving wall 1120 is provided with a pair of communication holes 1132 and 1133 corresponding to the sensor buffer chambers 1122 and 1123. A delivery passage for feeding the stored ink to an outside is provided in the cartridge case 1101, which is not shown. The sensor unit 1200 is positioned in the vicinity of the terminal of the delivery passage (the vicinity of the ink delivery port). In this case, the sensor buffer chamber 1122 on the upstream side is caused to communicate with a delivery passage on the upstream side through a communication hole 1124 and the sensor buffer chamber 1123 on the downstream side is caused to communicate with the delivery passage on the downstream side which is close to the ink delivery port through a communication hole 1125. Moreover, lower faces of the sensor buffer chambers 1122 and 1123 are not sealed with a rigid wall but opened and the openings are covered with a sealing film 1105 formed of a resin.

As shown in FIGS. 12 and 13, the sensor unit 1200 is constituted by a plate-shaped unit base 1210 having a recessed portion 1211 on an upper face and formed of a resin, a plate-shaped sensor base 1220 accommodated in the recessed portion 1211 provided on the upper face of the unit base 1210 and formed of a metal, a sensor chip 1230 mounted and fixed onto the upper face of the sensor base 1220 and formed of ceramic, for example, an adhesive film 1240 for fixing the sensor base 1220 to the unit base 1210, a pair of terminal plates 1250 disposed on an upper side of the unit base 1210, a plate-shaped pressing cover 1260 for pressing the terminal plate 1250 and protecting the sensor chip 1230, and the seal ring 1270 provided on a lower face of the unit base 1210 and formed of a rubber.

Each of the components will be described in detail. As shown in FIG. 13, the unit base 1210 is formed by a material such as polyethylene and has the recessed portion 1211 for fitting the sensor base 1220 which is provided on a center of an upper face, and has an attachment wall 1215 set to be higher than an upper face wall 1214 by one step on an outside of the upper face wall 1214 around the recessed portion 1211. A pair of attachment walls 1215 are provided to be opposed to each other with the recessed portion 1211 interposed therebetween, and four support pins 1216 are positioned on the attachment walls 1215 and are erected on four corners of the upper face of the unit base 1210. Moreover, an entrance-side flow passage 1212 and an exit-side flow passage 1213 (liquid reserving spaces) constituted by circular through holes are provided on a bottom wall of the recessed portion 1211. Furthermore, an elliptical projected portion 1217 for fitting the seal ring 1270 is provided on a lower face of the unit base 1210 as shown in FIG. 12, and the entrance-side flow passage 1212 and the exit-side flow passage 1213 are positioned on the projected portion 1217. The seal ring 1270 is constituted by a ring packing formed of a rubber and has a lower face provided with an annular projected portion 1271 taking a semicircular section.

The sensor base 1220 is constituted by a metal plate such as stainless which has a higher rigidity than a resin in order to enhance acoustic characteristics of the sensor. The sensor base 1220 takes the shape of a rectangular plate having four chamfered corners and includes an entrance-side flow passage 1222 and an exit-side flow passage 1223 (liquid reserving spaces) formed by two through holes corresponding to the entrance-side flow passage 1212 and the exit-side flow passage 1213 in the unit base 1210.

An adhesive layer 1242 is formed on the upper face of the sensor base 1220 by sticking a double-sided adhesive film or applying an adhesive, for example, and the sensor chip 1230 is mounted and fixed onto the adhesive layer 1242. It is preferable that the adhesive layer 1242 should have a high adhesiveness of the sensor base 1220 and the sensor chip 1230. For example, it is preferable to use an olefin type film.

The sensor chip 1230 has a sensor cavity 1232 for receiving an ink (a liquid) to be a detection target, and has such a structure that the sensor cavity 1232 has a lower face opened too freely receive the ink and an upper face closed with an vibration plate 1233, and a piezoelectric unit 1234 is provided on an upper face of the vibration plate 1233.

More specifically, the sensor chip 1230 is constituted by a chip body 1231 having, on a center, the sensor cavity 1232 constituted by a circular opening and formed of ceramic, the vibration plate 1233 laminated on an upper face of the chip body 1231 and constituting a lower face wall of the sensor cavity 1232, the piezoelectric unit 1234 laminated on the vibration plate 1233, and terminals 1235 and 1236 laminated on the chip body 1231 as shown in FIGS. 14 and 15.

The piezoelectric unit 1234 is constituted by upper and lower electrode layers connected to the terminals 1235 and 1236 and a piezoelectric layer laminated between the upper and lower electrode layers, which is not specifically shown, and fulfills the function of deciding an ink end based on a difference in an electrical characteristic depending on the existence or non-existence of the ink in the sensor cavity 1232, for example. For a material of the piezoelectric layer, it is possible to use lead zirconate titanate (PZT), lanthanum lead zirconate titanate (PLZT) or a lead-free piezoelectric film which does not utilize lead.

In the sensor chip 1230, a lower face of the chip body 1231 is mounted on a central part of the upper face of the sensor base 1220 and is thus fixed integrally with the sensor base 1220 through the adhesive layer 1242, and the sensor base 1220 and the sensor chip 1230 are sealed with the adhesive layer 1242 at the same time. The entrance-side flow passages 1222 and 1212 and the exit-side flow passages 1223 and 1213 (the liquid reserving spaces) in the sensor base 1220 and the unit base 1210 communicate with the sensor cavity 1232 of the sensor chip 1230. By this structure, the ink enters the sensor cavity 1232 through the entrance-side flow passages 1212 and 1222 and is discharged from the sensor cavity 1232 through the exit-side flow passages 1223 and 1213.

Thus, the sensor base 1220 formed of a metal on which the sensor chip 1230 is mounted is accommodated in the recessed portion 1211 on the upper face of the unit base 1210. The adhesive film 1240 formed of a resin is put from thereabove so that the sensor base 1220 and the unit base 1210 are bonded integrally with each other.

More specifically, the adhesive film 1240 has an opening 1241 on a center and is put from above in a state in which the sensor base 1220 is accommodated in the recessed portion 1211 on the upper face of the unit base 1210 so that the sensor chip 1230 is exposed from the opening 1241 on the center. Moreover, the adhesive film 1240 has an inner peripheral portion bonded to the upper face of the sensor base 1220 through the adhesive layer 1242 and an outer peripheral portion bonded to the upper face wall 1214 provided around the recessed portion 1211 of the unit base 1210, that is, the adhesive film 1240 is stuck across the upper faces of the two components (the sensor base 1220 and the unit base 1210) so that the sensor base 1220 and the unit base 1210 are fixed to each other and are sealed at the same time.

It is preferable that the adhesive film 1240 should be formed by a material having a high adhesiveness to both the adhesive layer 1242 on the sensor base 1220 and the unit base 1210. Preferable examples of the adhesive film 1240 include a film in which an ester type and an olefin type are laminated and the olefin type is set to be a bonding side.

In this case, the upper face of the sensor base 1220 is protruded upward from the recessed portion 1211 of the unit base 1210. Consequently, the adhesive film 1240 is bonded to the upper face of the sensor base 1220 in a higher position than a bonding position to the upper face wall 1214 provided around the recessed portion 1211 of the unit base 1210. Thus, the height of a film bonding face to the sensor base 1220 is set to be greater than that of a film bonding face to the unit base 1210. Consequently, the sensor base 1220 can be pressed by means of the adhesive film 1240 with a step so that a fixing force of the sensor base 1220 to the unit base 1210 can be increased. Moreover, it is possible to carry out an attachment having no looseness.

Moreover, each of the terminal plates 1250 has a band-shaped board portion 1251, a spring piece 1252 protruded from a side edge of the board portion 1251, an attachment hole 1253 formed on both sides of the board portion 1251, and a bent piece 1254 formed on both ends of the board portion 1251, and is disposed on an upper face of the attachment wall 1215 of the unit- base 1210 in a state in which the support pins 1216 are inserted through the attachment holes 1253 to carry out positioning, respectively. The pressing cover 1260 is mounted from thereabove so that the terminal plate 1250 is interposed between the unit base 1210 and the pressing cover 1260, and the spring pieces 1252 are conducted in contact with the terminals 1235 and 1236 provided on the upper face of the sensor chip 230 in that state.

The pressing cover 1260 has a plate portion 1261 to be mounted on the upper face of the attachment wall 1215 of the unit base 1210 with the board portion 1251 of the terminal plate 1250 interposed therebetween, four attachment holes 1262 provided on four corners of the plate portion 1261 and fitted in the support pins 1216 of the unit base 1210, an erected wall 1263 provided on an upper face of a center of the plate portion 1261, a spring receiving seat 1264 provided on the erected wall 1263, and a recessed portion 1265 provided on a lower face of the plate portion 1261 and forming a relief of the spring piece 1252 of the terminal plate 1250, and is mounted on the upper face of the unit base 1210 while pressing the terminal plate 1250 from above and thus protects the sensor plate 1220 and the sensor chip 1230 which are accommodated in the recessed portion 1211 formed on the upper face of the unit base 1210.

In order to assemble the sensor unit 1200 by the above components, first of all, the adhesive layer 1242 is formed on the whole upper face of the sensor base 1220 and the sensor chip 1230 is mounted on the adhesive layer 1242. Consequently, the sensor chip 1230 and the sensor base 1220 are fixed and sealed integrally with each other through the adhesive layer 1242.

Subsequently, the sensor base 1220 provided integrally with the sensor chip 1230 is accommodated in the recessed portion 1211 formed on the upper face of the unit base 1210 and the adhesive film 1240 is put from above in that state. Consequently, the adhesive film 1240 has the inner peripheral portion bonded to the upper face of the sensor base 1220 through the adhesive layer 1242 and the outer peripheral portion bonded to the upper face wall 1214 provided around the recessed portion 1211 of the unit base 1210. Consequently, the sensor base 1220 and the unit base 1210 can be fixed and sealed integrally with each other through the adhesive film 1240.

Next, the terminal plate 1250 is provided on the unit base 1210 while the attachment hole 1253 is fitted around the support pin 1216 of the unit base 1210, and the pressing cover 1260 is disposed thereabove. Moreover, the seal ring 1270 is fitted around the projected portion 1217 formed on the lower face of the unit base 1210 in an optional stage. Thus, the sensor unit 1200 can be assembled.

The sensor unit 1200 is constituted as described above and is accommodated in the sensor accommodating recessed portion 1110 of the cartridge case 1100 together with the spring 1300. When the spring 1300 presses the pressing cover 1260 downward in the accommodating state as shown in FIG. 14, the seal ring 1270 provided on the lower face of the sensor unit 1200 comes in pressure contact with the sensor receiving wall 1120 in the sensor accommodating recessed portion 1110 while crushing. Consequently, a sealing property between the sensor unit 1200 and the cartridge case 1101 is maintained.

By carrying out the assembly, the buffer chamber 1122 on the upstream side in the cartridge case 1101 is caused to communicate with the entrance-side flow passages 1212 and 1222 in the sensor unit 1200 through the communication hole 1132 of the sensor receiving wall 1120 and the buffer chamber 1123 on the downstream side in the cartridge case 1101 is caused to communicate with the exit-side flow passages 1213 and 1223 in the sensor unit 1200 through the communication hole 1133 of the sensor receiving wall 1120 under the condition that the sealing property is maintained. The entrance-side flow passages 1212 and 1222, the sensor cavity 1232 and the exit-side flow passages 1213 and 1223 are provided in series on the delivery passage in the cartridge case 1101 so as to be arranged from the upstream side in this order.

The passage on the upstream side connected to the sensor cavity 1232 is constituted by the buffer chamber 1122 on the upstream side having a large passage section, the communication hole 1132, and the entrance-side flow passages 1212 and 1222 (narrow and small passages on the upstream side) in the sensor unit 1200 having a small passage section. Moreover, the passage on the downstream side connected to the sensor cavity 1232 is constituted by the buffer chamber 1123 on the downstream side having a large passage section, the communicating port 1133, and the exit-side flow passages 1213 and 1223 (narrow and small passages on the downstream side) in the sensor unit 1200 having a small passage section.

As shown in FIG. 11, moreover, the sealing cover 1400 for closing the opening on the side face of the sensor accommodating recessed portion 1110 has such a structure that a recessed portion 1402 for fitting the board 1500 is provided on an external surface of a plate-shaped body 1401, and an opening 1403 from which the bent piece 1254 of each terminal plate 1250 is exposed and pins 1406 and 1407 for positioning the board 1500 are provided on a bottom wall of the recessed portion 1402, and an engagement click 1405 to be engaged with a predetermined portion in the sensor accommodating recessed portion 1110 is protruded from an internal surface of the body 1401, and is attached to the cartridge case 1101 in a state in which the sensor unit 1200 and the spring 1300 are accommodated in the sensor accommodating recessed portion 1110. In this state, the board 1500 is attached to the recessed portion 1402 of the sealing cover 1400. Consequently, a predetermined contact 1501 of the board 1500 and the terminal plate 1250 are conducted in contact with each other. The board 1500 is provided with a notch 1506 and a hole 1507 to be engaged with the pins 1406 and 1407 for positioning.

According to the embodiment described above, by simply incorporating the sensor base 1220 mounting the sensor chip 1230 into the unit base 1210 from above and sticking the adhesive film 1240 across upper faces of two components which are arranged, that is, both of the upper faces of the sensor base 1220 and the unit base 1210 in that state, it is possible to fix and seal the two components formed by different materials (the sensor base 1220 formed of a metal and the unit base 1210 formed of a resin) at the same time. Accordingly, an assembling workability is very excellent. Moreover, the adhesive film 1240 is simply stuck across the two components. Therefore, it is possible to seal the components without a great influence of precision in the dimension of each of the components. In the case in which the adhesive film 1240 is to be welded by heating and pressurizing through a mass-produced machine, for example, it is possible to enhance a sealing performance by simply managing a temperature and a pressure through the mass-produced machine. Therefore, it is possible to carry out a stabilization in the mass production. Furthermore, the adhesive film 1240 to influence the sealing property can easily be attached, and furthermore, a space efficiency is high. Therefore, it is possible to reduce the size of the sensor unit 1200.

Moreover, there is employed a structure in which the entrance-side flow passages 1212 and 1222 and the exit-side flow passages 1213 and 1223 for the sensor cavity 1232 are formed in the sensor base 1220 and the unit base 1210 respectively and the ink flows into the sensor cavity 1232 through the entrance-side flow passages 1212 and 1222 and is discharged through the exit-side flow passages 1213 and 1223. Therefore, the ink persistently flows to the sensor cavity 1232. Consequently, it is possible to prevent an erroneous detection from being caused by the stay of the liquid or air bubbles in the sensor cavity 1232.

Furthermore, the height of the bonding face of the adhesive film 1240 to the unit base 1210 is set to be smaller than that of the bonding face to the sensor base 1220. Therefore, it is possible to press the sensor base 1220 with a step by means of the adhesive film 1240 and to increase a fixing force of the sensor base 1220 to the unit base 1210. Moreover, it is possible to carry out an attachment having no looseness.

In addition, the sensor unit 1200 is disposed in the vicinity of the terminal of the delivery passage in the cartridge case 1101, and the entrance-side flow passages 1212 and 1222, the sensor cavity 1232 and the exit-side flow passages 1213 and 1223 in the sensor unit 1200 are provided in series in the delivery passage so as to be arranged from the upstream side in this order. Therefore, it is possible to accurately detect the residual amount of the liquid in the ink cartridge 1100.

Next, a principle for detecting ink will be described by using, as an example, the sensor unit 200 according to the first embodiment of the invention.

When the ink in the ink cartridge 101 is consumed, the reserved ink is sent to the printing head 12 of the inkjet printer from the ink delivery portion 103 through the sensor cavity 232 of the sensor unit 200.

At this time, when the ink sufficiently remains in the ink cartridge 100, the sensor cavity 232 is filled with the ink. On the other hand, when the amount of ink remaining in the ink cartridge 100 is reduced, the sensor cavity 232 is not filled with the ink.

Therefore, the sensor unit 200 detects difference in acoustic impedance due to the variation in such a state. Accordingly, it is possible to detect whether the ink sufficiently remains or whether a part of the ink is consumed and the amount of remaining ink is reduced.

Specifically, when a voltage is applied to the piezoelectric element 234, the vibration plate 233 is deformed with the deformation of the piezoelectric element 234. When the application of the voltage is released after compulsorily deforming the piezoelectric element 234, flexural vibration remains in the vibration plate 233 for a moment. The residual vibration is free vibration of the vibration plate 233 and the medium in the cavity 232. Therefore, by allowing the voltage applied to the piezoelectric element 234 to have a pulse waveform or a rectangular waveform, it is possible to easily obtain resonance between the vibration plate 233 and the medium after the application of the voltage.

The residual vibration is vibration of the vibration plate 233 and accompanies the deformation of the piezoelectric element 234. For this reason, the piezoelectric element 234 generates the back electromotive force with the residual vibration. The back electromotive force is detected externally through the terminal plates 250.

Since the resonance frequency can be specified by the detected back electromotive force, it is possible to detect the existence of ink in the ink cartridge 100 on the basis of the resonance frequency.

What is claimed is:

1. A liquid detecting device comprising:

a unit base, provided with a recessed portion on an upper face thereof and containing a first material;

a sensor base, accommodated in the recessed portion and containing a second material different from the first material;

a sensor chip, mounted on an upper face of the sensor base and having a sensor cavity for receiving a liquid as a detection target, in which a lower face of the sensor cavity is formed to be opened for allowing the liquid to flow therein and an upper face thereof is closed by a vibration plate and provided with a piezoelectric element mounted on an upper face of the vibration plate;

an adhesive layer, formed on the upper face of the sensor base and fixing and sealing the sensor chip and the sensor base to each other; and an adhesive film, which fixes and seals the sensor base and the unit base to each other and of which an inner peripheral portion is adhered to the upper face of the sensor base and an outer peripheral portion is adhered to the upper face of the unit base.

2. The liquid detecting device according to claim 1, further comprising a liquid reserving space, formed in the unit base and the sensor base and communicating with the sensor cavity.

3. The liquid detecting device according to claim 2, wherein the sensor base and the unit base have, as the liquid reserving space, a first passage through which the liquid is supplied to the sensor cavity and a second passage through which the liquid is discharged from the sensor cavity.

4. A liquid container comprising:

a container body having a feeding passage feeding a liquid stored therein to an outside; and the liquid detecting device according to claim 3, attached to the container body in the vicinity of a terminal of the feeding passage, wherein the first passage, the sensor cavity and the second passage are connected to the feeding passage so as to be arranged in series from an upstream side in this order.

5. The liquid detecting device according to claim 1, wherein the inner peripheral portion of the adhesive film is adhered to the upper face of the sensor base through the adhesive layer.

6. The liquid detecting device according to claim 1, wherein the first material is a resin.

7. The liquid detecting device according to claim 1, wherein the second material is a metal.

8. The liquid detecting device according to claim 1, wherein the upper face of the sensor base is positioned higher than the upper face of the unit base.

9. A method of manufacturing a liquid detecting device comprising:

a unit base, provided with a recessed portion on an upper face thereof and containing a first material;

a sensor base, accommodated in the recessed portion and containing a second material different from the first material;

a sensor chip, mounted on an upper face of the sensor base and having a sensor cavity for receiving a liquid as a detection target, in which a lower face of the sensor cavity is formed to be opened for allowing the liquid to flow therein and an upper face thereof is closed by a vibration plate and provided with a piezoelectric element mounted on an upper face of the vibration plate; the method comprising:

forming an adhesive layer on the upper face of the sensor base;

mounting the sensor chip on the adhesive layer to fix the sensor chip and the sensor base integrally by the adhesive layer and seal the sensor chip and the sensor base;

accommodating the sensor base integrated with the sensor chip in the recessed portion; and putting an adhesive film from above in that state to adhere an inner peripheral portion of the adhesive film to the upper face of the sensor base and to adhere an outer peripheral portion of the adhesive film to the upper face of the unit base, thereby integrally fixing and sealing the sensor base and the unit base.

10. A liquid container comprising:

a container body having a liquid reservoir therein, a delivery passage for sending out a liquid from the liquid reservoir to an outside, and a sensor accommodating portion disposed in the delivery passage;

a sensor unit, mounted in the sensor accommodating portion for detecting the liquid;

a buffer chamber, disposed adjacent to the sensor accommodating portion through a sensor receiving wall in the container body, and disposed in series in the delivery passage so as to communicate with an upstream of the delivery passage and a downstream thereof;

a ring-shaped seal member, having elasticity and sealing the sensor unit and the sensor receiving wall; and a pressurizing spring, pressurizing the sensor unit against the sensor receiving wall to press the seal member and give a pressure necessary for sealing the seal member, the sensor unit, and the sensor receiving wall.

11. The liquid container according to claim 10, wherein the sensor unit includes a sensor chip for detecting the liquid, a sensor base supporting the sensor chip, and a unit base supporting the sensor base, and the pressurizing spring pressurizes the sensor unit against the sensor receiving wall through the sensor base or the sensor chip.

12. The liquid container according to claim 11, wherein the sensor chip has a sensor cavity for receiving the liquid as a detection target, in which a lower face of the sensor cavity is opened so as to receive the liquid, an upper face thereof is closed by a vibration plate, and a piezoelectric element is disposed on an upper face of the vibration plate, the sensor base is a metal base body which mounts and fixes the sensor chip, the unit base is a resin base body which mounts and fixes the sensor base, and in which a lower face thereof is opposed to the sensor receiving wall through the seal member when the sensor unit is mounted in the sensor accommodating portion, and a liquid reserving space communicating with the sensor cavity is formed in the sensor base and the unit base, and a flow passage communicating with the liquid reserving space and the buffer chamber is provided in the sensor receiving wall and at a location inside the ring-shaped seal member.

13. The liquid container according to claim 10, wherein the pressurizing spring is interposed between a wall of the sensor accommodating portion opposed to the sensor unit and the sensor unit in a compressed state.

14. The liquid container according to claim 10, further comprising a pressing cover disposed above the sensor chip, wherein the pressurizing spring pressurizes the sensor base or the sensor chip through the pressing cover.

15. The liquid container according to claim 10, wherein a recessed portion is formed on an upper face of the unit base, and the sensor base is accommodated in the recessed portion, the sensor chip and the sensor base are fixed and sealed to each other with an adhesive layer disposed on an upper face of the sensor base, and the sensor base and the unit base are fixed and sealed to each other with an adhesive film of which an inner peripheral portion is adhered to the upper face of the sensor base and an outer peripheral portion is adhered to the upper face of the unit base defining the recessed portion.

16. The liquid container according to claim 15, wherein the upper face of the sensor base is positioned higher than the upper face of the unit base.

17. The liquid container according to claim 10, wherein the sensor base and the unit base have, as the liquid reserving space, an entrance-side flow passage and an exit-side flow passage, the container body has, as the buffer chamber, an upstream buffer chamber communicating with the upstream of the delivery passage and the entrance-side flow passage and a downstream buffer chamber communicating with the downstream of the delivery passage and the exit-side flow passage, and the liquid flowing from the upstream of the delivery passage is supplied to the sensor cavity through the upstream buffer chamber and the entrance-side flow passage and is discharged to the downstream of the delivery passage through the exit-side flow passage and the downstream buffer chamber from the sensor cavity.

18. The liquid container according to claim 10, wherein the sensor unit includes:

a sensor chip having a sensor cavity for receiving the liquid as a detection target, in which a lower face of the sensor cavity is formed to be opened for allowing the liquid to flow therein and an upper face of the sensor cavity is closed by a vibration plate and provided with a piezoelectric element mounted on an upper face of the vibration plate;

a sensor base which mounts and fixes the sensor chip and contains a first material; and a unit base which mounts and fixes the sensor base and contains a second material different from the first material, and in which a lower face thereof is opposed to the sensor receiving wall through the seal member when the sensor unit is mounted in the sensor accommodating portion, and wherein the pressurizing spring pressurizes the unit base while avoiding pressuring the sensor base and the sensor chip.

19. The liquid detecting device according to claim 18, further comprising:

a liquid reserving space, formed in the unit base and the sensor base and communicating with the sensor cavity; and a flow passage communicating with the liquid reserving space and the buffer chamber at an inside of the ring-shaped seal member in the sensor receiving wall.

20. The liquid detecting device according to claim 18, wherein the first material is a metal.

21. The liquid detecting device according to claim 18, wherein the second material is a resin.

22. The liquid container according to claim 18, wherein the pressurizing spring is interposed between a wall of the sensor accommodating portion opposed to the sensor unit and the sensor unit in a compressed state.

23. The liquid container according to claim 18, further comprising a pressing cover mounted above the unit base to cover the sensor chip without contacting the sensor chip and the sensor base, wherein the pressurizing spring pressurizes the unit base through the pressing cover.

24. The liquid container according to claim 18, further comprising: a pressing cover mounted above the unit base to cover the sensor chip and sensor base without contacting the unit base; and a screw with which the pressing cover is fixed to the container body, and wherein the pressurizing spring is interposed between the pressing cover and the unit base in a compressed state.

25. The liquid container according to claim 24, wherein the pressurizing spring is a leaf spring formed integrally with a terminal plate electrically connected to an electrode of the sensor chip.

26. The liquid container according to claim 18, wherein a recessed portion is formed on an upper face of the unit base, and the sensor base is accommodated in the recessed portion, the sensor chip and the sensor base are fixed and sealed to each other with an adhesive layer disposed on an upper face of the sensor base, and the sensor base and the unit base are fixed and sealed to each other with an adhesive film of which an inner peripheral portion is adhered to the upper face of the sensor base and of which an outer peripheral portion is adhered to the upper face of the unit base.

27. The liquid container according to claim 26, wherein the upper face of the sensor base is positioned higher than the upper face of the unit base.

28. The liquid container according to claim 18, wherein the sensor base and the unit base have, as the liquid reserving space, an entrance-side flow passage and an exit-side flow passage, the container body has, as the buffer chamber, an upstream buffer chamber communicating with the upstream of the delivery passage and the entrance-side flow passage and a downstream buffer chamber communicating with the downstream of the delivery passage and the exit-side flow passage, and the liquid flowing from the upstream of the delivery passage is supplied to the sensor cavity through the upstream buffer chamber and the entrance-side flow passage and is discharged to the downstream of the delivery passage through the exit-side flow passage and the downstream buffer chamber from the sensor cavity.

29. A liquid container comprising:

a container body having a liquid reservoir therein, a delivery passage for sending out a liquid from the liquid reservoir to an outside, and a sensor accommodating portion;

a sensor unit, mounted in the sensor accommodating portion for detecting the liquid in a portion of the delivery passage, the sensor unit having a sensor cavity in fluid communication with the delivery passage;

a deformable seal member for sealing the sensor unit and a sensor receiving wall of the sensor accommodating portion while maintaining the fluid communication with the sensor cavity and the delivery passage; and a pressurizing spring for pressurizing the sensor unit against the sensor receiving wall to give a pressure necessary for sealing the sensor unit and the sensor receiving wall to the deformable seal member.

* * * * *